United States Patent [19]

Gutierrez et al.

[11] Patent Number: 5,366,647
[45] Date of Patent: Nov. 22, 1994

[54] DERIVATIZED ETHYLENE ALPHA-OLEFIN POLYMER USEFUL AS MULTIFUNCTIONAL VISCOSITY INDEX IMPROVER ADDITIVE FOR OLEAGINOUS COMPOSITION (PT-796)

[75] Inventors: Antonio Gutierrez, Mercerville; Robert D. Lundberg, Bridgewater; Won R. Song, Short Hills, all of N.J.

[73] Assignee: Exxon Chemical Patents Inc., Linden, N.J.

[21] Appl. No.: 118,559

[22] Filed: Sep. 9, 1993

Related U.S. Application Data

[62] Division of Ser. No. 473,628, Feb. 1, 1990, Pat. No. 5,275,747.

[51] Int. Cl.$^5$ .................. C10M 133/52; C10M 129/93
[52] U.S. Cl. ................. 252/51.5 A; 252/51.5 R; 252/56 R
[58] Field of Search .............. 252/51.5 A, 51.5 R, 252/56 R

[56] References Cited

U.S. PATENT DOCUMENTS

| | | | |
|---|---|---|---|
| 3,316,177 | 4/1967 | Dorer, Jr. | 252/51.5 |
| 3,326,804 | 6/1967 | Hu | 252/34 |
| 3,563,964 | 2/1971 | Wagensommer | 260/80.78 |
| 3,697,429 | 10/1972 | Engel et al. | 252/59 |
| 4,089,794 | 5/1978 | Engel et al. | 252/51.5 A |
| 4,137,185 | 1/1979 | Gardiner et al. | 252/33 |
| 4,144,181 | 3/1979 | Elliott et al. | 252/33 |
| 4,160,739 | 7/1979 | Stambaugh et al. | 252/34 |
| 4,161,452 | 7/1979 | Stambaugh et al. | 252/34 |
| 4,171,273 | 10/1979 | Waldbillig et al. | 252/51.5 A |
| 4,219,432 | 8/1980 | Girgenti et al. | 252/51.5 A |
| 4,306,041 | 12/1981 | Cozewith et al. | 526/68 |
| 4,507,515 | 3/1985 | Johnston et al. | 585/12 |
| 4,517,104 | 5/1985 | Bloch et al. | 252/51.5 A |
| 4,540,753 | 9/1985 | Cozewith et al. | 526/88 |
| 4,557,847 | 12/1985 | Gutierrez et al. | 252/51.5 A |
| 4,575,574 | 3/1986 | Kresge et al. | 585/520 |
| 4,632,769 | 12/1986 | Gutierrez et al. | 252/48.6 |
| 4,666,619 | 5/1987 | Kresge et al. | 252/565 |
| 4,668,834 | 5/1987 | Rim et al. | 585/12 |
| 4,693,838 | 9/1987 | Varma et al. | 252/51.5 R |
| 4,707,285 | 11/1987 | Brewsler et al. | 252/50 |
| 5,017,299 | 5/1991 | Gutierrez et al. | 252/51.5 R |
| 5,275,747 | 1/1994 | Gutierrez et al. | 252/51.5 A |

FOREIGN PATENT DOCUMENTS

| | | |
|---|---|---|
| 0128046 | 12/1984 | European Pat. Off. |
| 0129368 | 12/1984 | European Pat. Off. |
| 0257696 | 3/1988 | European Pat. Off. |
| 0353935 | 8/1988 | European Pat. Off. |
| 129303 | 6/1987 | Japan |
| WO88/01626 | 10/1988 | Japan |

*Primary Examiner*—Jacqueline V. Howard
*Attorney, Agent, or Firm*—T. V. Kowalchyn

[57] ABSTRACT

The present invention is directed to an oil-soluble oleaginous composition additive comprising at least one terminally unsaturated ethylene alpha-olefin polymer of from above 20,000 to about 500,000 number average molecular weight substituted with mono- or dicarboxylic acid producing moieties (preferably dicarboxylic acid or anhydride moieties), wherein the terminal unsaturation comprises terminal ethenylidene unsaturation. The mono- and dicarboxylic acid or anhydride substituted polymers of this invention are useful per se as additives to oleaginous compositions such as lubricating oils, and can also be reacted with a nucleophilic reagent, such as amines, alcohols, amino alcohols and reactive metal compounds, to form products which are also useful oleaginous composition additives, e.g., as multifunctional viscosity index improvers.

8 Claims, No Drawings

DERIVATIZED ETHYLENE ALPHA-OLEFIN POLYMER USEFUL AS MULTIFUNCTIONAL VISCOSITY INDEX IMPROVER ADDITIVE FOR OLEAGINOUS COMPOSITION (PT-796)

This is a division, of application Ser. No. 07/473,628, filed Feb. 1, 1990 now U.S. Pat. No. 5,275,747.

FIELD OF THE INVENTION

This invention relates to oil soluble compositions useful as multifunctional viscosity index improver additives for oleaginous compositions, including lubricating oil compositions, and to concentrates containing said additives.

BACKGROUND OF THE INVENTION

Nitrogen and ester containing lubricating oil multifunctional viscosity index improver, e.g., viscosity index improver-dispersant, additives have been widely used by the industry. Typically, these multifunctional viscosity index improvers are prepared from a long chain hydrocarbon polymer by reacting the polymer with an acid producing moiety such as acid or maleic anhydride to form the corresponding polymer which is substituted with succinic acid or anhydride groups. Ethylene-propylene has been widely used as the polymer of choice.

High molecular weight ethylene-propylene polymers and ethylene-propylene-diene terpolymers, having viscosity average molecular weights of from about 20,000 to 300,000, are generally produced employing Ziegler catalysts, generally VCl4 or VOCl3 with a halide source, such as organoaluminum halides and/or hydrogen halides. Such high molecular weight EP and EPDM polymers find use as viscosity index improvers. See, e.g., U.S. Pat. Nos. 3,563,964; 3,697,429; 4,306,041; 4,540,753; 4,575,574; and 4,666,619.

The concept of derivatizing V.I. improving high molecular weight ethylene copolymers with acid or anhydride moieties such as maleic anhydride followed by reaction with an amine to form a multifunctional viscosity index improver, e.g., a viscosity index improver-dispersant, oil additive is known in the art as indicated by the following patents.

U.S. Pat. No. 3,316,177 teaches ethylene copolymers of at least 50,000, such as ethylene-propylene, or ethylene-propylene-diene, which are heated to elevated temperatures in the presence of oxygen so as to oxidize the polymer and cause its reaction with maleic anhydride which is present during the oxidation. The resulting polymer can then be reacted with alkylene polyamines.

U.S. Pat. No. 3,326,804 teaches reacting ethylene copolymers with oxygen or ozone, to form a hydroperoxidized polymer, which is grafted with maleic anhydride followed by reaction with polyalkylene polyamines. Preferred are ethylene-propylene copolymers, having $M_v$ from 100,000 to 500,000, prepared by Ziegler type catalysts.

U.S. Pat. No. 4,160,739 teaches an ethylene copolymer ($M_v$=10,000 to 200,000) which is grafted, using a free radical technique, with alternating maleic anhydride and a second polymerizable monomer such as methacrylic acid, which materials are reacted with an amine having a single primary, or a single secondary, amine group.

U.S. Pat. No. 4,161,452 relates to graft copolymers wherein the backbone polymer is a polymeric hydrocarbon such as EP copolymer or EPDM ($M_v$=10,000 to 200,000) and the grafted units are the residues of an addition copolymerizable monomer system comprising, e.g., maleic anhydride, and at least one other addition monomer.

U.S. Pat. No. 4,171,273 reacts an ethylene copolymer ($M_v$=10,000 to 100,000) with maleic anhydride in the presence of a free radical initiator and then with mixtures of $C_4$ to $C_{12}$ n-alcohol and amine such as N-aminopropylmorpholine or dimethylamino propyl amine to form a V.I.-dispersant-pour depressant additive.

U.S. Pat. No. 4,517,104 relates to EP and EPDM viscosity index improver-dispersant additives prepared from EP polymer ($M_n$=5000 to 500,000), by maleic anhydride grafting and reaction with polyamines.

The following references include disclosures of EP-/EPDM polymers of $M_n$ of 700/500,000, also prepared by conventional Ziegler catalysts.

U.S. Pat. No. 4,089,794 teaches grafting the ethylene copolymer ($M_n$=700 to 500,000) with maleic anhydride using peroxide in a lubricating oil solution, wherein the grafting is preferably carried out under nitrogen, followed by reaction with polyamine.

U.S. Pat. No. 4,137,185 teaches reacting $C_1$ to $C_{30}$ monocarboxylic acid anhydrides, and dicarboxylic anhydrides, such as acetic anhydride, succinic anhydride, etc. with an ethylene copolymer ($M_n$=700 to 500,000) reacted with maleic anhydride and a polyalkylene polyamine to inhibit cross linking and viscosity increase due to further reaction of any primary amine groups which were initially unreacted.

U.S. Pat. No. 4,144,181 is similar to 4,137,185 in that it teaches using a sulfonic acid to inactivate the remaining primary amine groups when a maleic anhydride grafted ethylene-propylene copolymer ($M_n$=700 to 500,000) is reacted with a polyamine.

U.S. Pat. No. 4,219,432 teaches maleic anhydride grafted ethylene copolymer ($M_n$=700 to 500,000) reacted with a mixture of an amine having only one primary group together with a second amine having two or more primary groups.

Related disclosures of maleic anhydride grafted, aminated ethylene-propylene polymer viscosity improver-dispersant additives useful in lubricating oil compositions are contained in U.S. Pat. Nos. 4,507,515; 4,557,847; 4,632,769; 4,693,838; and 4,707,285.

However, these conventional multifunctional viscosity index improvers derived from conventional ethylene alpha-olefin copolymers by such methods as free-radical initiated grafting require relatively harsh reaction conditions in order to graft the acid or anhydride moieties such as maleic anhydride onto the ethylene alpha-olefin copolymer backbone. This may result in economic disadvantages, the formation of deleterious or unwanted byproducts, and incomplete reaction of the ethylene alpha-olefin copolymer with the acid or anhydride moieties (low active ingredient—a.i.). The present invention, by utilizing an ethylene alpha-olefin copolymer having a high degree of terminal ethylenylidene unsaturation, remedies these disadvantages.

U.S. Pat. No. 4,668,834 to Uniroyal Chemical discloses preparation (via certain metallocene and alumoxane catalyst systems) and composition of ethylene-alpha olefin copolymers and terpolymers having vinylidene-type terminal unsaturation, which are disclosed to be useful as intermediates in epoxy-grafted encapsulation compositions.

Japanese Published Patent Application 87-129,303A of Mitsui Petrochemical relates to narrow molecular weight distribution ($M_w/M_n < 2.5$) ethylene alpha-olefin copolymers containing 85–99 mol% ethylene, which are disclosed to be used for dispersing agents, modifiers or materials to produce toners. The copolymers (having crystallinity of from 5–85%) are prepared in the presence of a catalyst system comprising Zr compounds having at least one cycloalkadienyl group and alumoxane.

European Patent 128,046 discloses (co)polyolefin reactor blends of polyethylene and ethylene higher alpha-olefin copolymers prepared by employing described dual-metallocene/alumoxane catalyst systems.

European Patent Publication 129,368 discloses metallocene/alumoxane catalysts useful for the preparation of ethylene homopolymer and ethylene higher alpha-olefin copolymers.

European Patent Application Publication 257,696 A1 relates to a process for dimerizing alpha-olefins using a catalyst comprising certain metallocene/alumoxane systems.

PCT Published Patent Application WO 88/01626 relates to transition metal compound/alumoxane catalysts for polymerizing alpha-olefins.

SUMMARY OF THE INVENTION

The present invention is directed to an oil-soluble composition of matter useful as a multifunctional viscosity index improver (MFVI) oleaginous compositions additive comprising ethylene alpha-olefin interpolymers of from above 20,000 to about 500,000 number average molecular weight terminally substituted with mono- or dicarboxylic acid producing moieties (preferably acid or anhydride moieties), wherein the ethylene alpha-olefin polymer group is a terminally unsaturated ethylene alpha-olefin polymer wherein the terminal unsaturation comprises ethenylidene unsaturation. The monocarboxylic acid and the dicarboxylic acid or anhydride substituted polymers of this invention are useful per se as additives for lubricating oils, fuel oils, fuels, etc. and can also be reacted with a nucleophilic reagent, such as amines, alcohols, amino alcohols and metal compounds, to form derivative products which are also useful lubricating oil, fuel oil, fuel, etc., additives, e.g., as viscosity index improvers-dispersants.

The materials of the invention are different from the conventional prior disclosure material because of their effectiveness and their ability to provide enhanced lubricating oil viscosity index improvement-dispersancy.

The process of this invention permits the preparation of lubricating oil multifunctional viscosity index improver additives which are characterized by a high active ingredient content (usually at least about 60 wt. %, and up to about 95 wt. %). In addition, the ethylene alpha-olefin polymers substituted by mono- and di-carboxylic acid producing moieties of this invention can be characterized by VR values (as hereinafter defined) of not greater than about 4.1, thereby providing advantageous viscosity modifying properties to the lubricating oils containing them. The present invention can produce such substituted polymers in a highly concentrated form as substantially halogen free materials, thereby reducing the corrositivity processing difficulties and environmental concerns which are associated with halogen-containing lubricating oil additives.

DETAILED DESCRIPTION OF THE INVENTION

Preparation of Ethylene Alpha-Olefin Polymer

The polymers employed in this invention are polymers of ethylene and at least one alpha-olefin having the formula $H_2C=CHR^1$ wherein $R^1$ is straight chain or branched chain alkyl radical comprising 1 to 18 carbon atoms and wherein the polymer contains a high degree of terminal ethenylidene unsaturation. Preferably $R^1$ in the above formula is alkyl of from 1 to 8 carbon atoms, and more preferably is alkyl of from 1 to 2 carbon atoms. Therefore, useful comonomers with ethylene in this invention include propylene, 1-butene, hexene-1, octene-1, 4-methylpentene-1, decene-1, dodecene-1, tridecene-1, tetradecene-1, pentadecene-1, hexadecene-1, heptadecene-1, octadecene-1, nonadecene-1 and mixtures thereof (e.g., mixtures of propylene and 1-butene, and the like).

Exemplary of such polymers are ethylene-propylene copolymers, ethylene-butene-1 copolymers and the like. Preferred polymers are copolymers of ethylene and propylene and ethylene and butene-1.

The molar ethylene content of the polymers employed in this invention is preferably in the range of between about 20 and about 80 percent, and more preferably between about 30 and about 70 percent. When propylene and/or butene-1 are employed as comonomer(s) with ethylene, the ethylene content of such copolymers is most preferably between about 45 and about 65 percent, although higher or lower ethylene contents may be present.

The polymers employed in this invention generally possess a number average molecular weight of at least greater than 20,000, preferably at least about 25,000, more preferably at least about 30,000, and most preferably at least about 35,000. Generally, the polymers should not exceed a number average molecular weight of about 500,000, preferably about 200,000, more preferably about 100,000, and most preferably about 50,000. The number average molecular weight for such polymers can be determined by several known techniques. A convenient method for such determination is by size exclusion chromatography (also known as gel permeation chromatography (GPC)) which additionally provides molecular weight distribution information, see W. W. Yau, J. J. Kirkland and D. D. Bly, "Modern Size Exclusion Liquid Chromatography", John Wiley and Sons, New York, 1979.

The polymers employed in this invention preferably exhibit a degree of crystallinity such that, when functionalized, they are readily soluble in mineral oils.

The polymers employed in this invention are further characterized in that up to about 95% and more of the polymer chains possess terminal ethenylidene-type unsaturation. Thus, one end of such polymers will be of the formula $POLY—C(T^1)=CH_2$ wherein $T^1$ is $C_1$ to $C_{18}$ alkyl, preferably $C_1$ to $C_8$ alkyl, and more preferably $C_1$ to $C_2$ alkyl, (e.g., methyl or ethyl) and wherein POLY represents the polymer chain. The chain length of the $T^1$ alkyl group will vary depending on the comonomer(s) selected for use in the polymerization. A minor amount of the polymer chains can contain terminal ethenyl unsaturation, i.e. $POLY—CH=CH_2$, and a portion of the polymers can contain internal monounsaturation, e.g. $POLY—CH=CH(T^1)$, wherein $T^1$ is as defined above.

The polymers employed in this invention comprise polymer chains, at least about 30 percent of which possess terminal ethenylidene unsaturation. Preferably at least about 50 percent, more preferably at least about 60 percent, and most preferably at least about 75 percent (e.g. 75–98%), of such polymer chains exhibit terminal ethyenylidene unsaturation. The percentage of polymer chains exhibiting terminal ethyenylidene unsaturation may be determined by FTIR spectroscopic analysis, titration, or $C^{13}$NMR.

The polymers employed in this invention may generally be prepared substantially in accordance with the procedures described in U.S. Pat. Nos. 4,752,597 and 4,871,705, in European Patent Publications 128,046 and 129,368, and in co-pending Ser. No. 728,111, filed Apr. 29, 1985, and copending Ser. No. 93,460, filed Sep. 10, 1987, the disclosures of all of which are hereby incorporated by reference in their entirety.

The polymers for use in the present invention can be prepared by polymerizing monomer mixtures comprising ethylene in combination with other monomers such as alpha-olefins having from 3 to 20 carbon atoms (and preferably from 3–4 carbon atoms, i.e., propylene, butene-1, and mixtures thereof) in the presence of a catalyst system comprising at least one metallocene (e.g., a cyclopentadienyl-transition metal compound) and an alumoxane compound. The comonomer content can be controlled through the selection of the metallocene catalyst component and by controlling the partial pressure of the various monomers.

The catalysts employed in the production of the reactant polymers are organometallic coordination compounds which are cyclopentadienyl derivatives of a Group 4b metal of the Periodic Table of the Elements (56th Edition of Handbook of Chemistry and Physics, CRC Press [1975]) and include mono, di and tricyclopentadienyls and their derivatives of the transition metals. Particularly desirable are the metallocene of a Group 4b metal such as titanium, zirconium, and hafnium. The alumoxanes employed in forming the reaction product with the metallocenes are themselves the reaction products of an aluminum trialkyl with water.

In general, at least one metallocene compound is employed in the formation of the catalyst. As indicated, supra, metallocene is a metal derivative of a cyclopentadiene. The metallocenes usefully employed in accordance with this invention contain at least one cyclopentadiene ring. The metal is selected from the Group 4b preferably titanium, zirconium, and hafnium, and most preferably hafnium and zirconium. The cyclopentadienyl ring can be unsubstituted or contain one or more substituents (e.g., from 1 to 5 substituents) such as, for example, a hydrocarbyl substituent (e.g., up to 5 $C_1$ to $C_5$ hydrocarbyl substituents) or other substituents, e.g. such as, for example, a trialkyl silyl substituent. The metallocene can contain one, two, or three cyclopentadienyl rings; however, two rings are preferred.

Useful metallocenes can be represented by the general formulas:

$$(Cp)_m MR_n X_q \quad \text{(I)}$$

wherein Cp is a cyclopentadienyl ring, M is a Group 4b transition metal, R is a hydrocarbyl group or hydrocarboxy group having from 1 to 20 carbon atoms, X is a halogen, and m is a whole number from 1 to 3, n is a whole number from 0 to 3, and q is a whole number from 0 to 3.

$$(C_5R'_k)_g R''_s (C_5R'_k) MQ_{3-g} \quad \text{(II)}$$

and $$R''_s (C_5R'_k)_2 MQ' \quad \text{(III)}$$

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms, a silicon containing hydrocarbyl radical, or hydrocarbyl radicals wherein two carbon atoms are Joined together to form a $C_4$-$C_6$ ring, R'' is a $C_1$-$C_4$ alkylene radical, a dialkyl germanium or silicon, or a alkyl phosphine or amine radical bridging two $(C_4R'_k)$ rings, Q is a hydrocarbyl radical such as aryl, alkyl, alkenyl, alkylaryl, or aryl alkyl radical having from 1–20 carbon atoms, hydrocarboxy radical having from 1–20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1, and k is 5 when s is 0, and M is as defined above. Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary silicon containing hydrocarbyl radicals are trimethylsilyl, triethylsilyl and triphenylsilyl. Exemplary halogen atoms include chlorine, bromine, fluorine and iodine and of these halogen atoms, chlorine is preferred. Exemplary hydrocarboxy radicals are methoxy ethoxy, butoxy, amyloxy and the like. Exemplary of the alkylidene radicals is methylidene, ethylidene and propylidene.

Illustrative, but non-limiting examples of the metallocenes represented by formula I are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium dimethyl and diphenyl, bis(cyclopentadienyl)titanium di-neopentyl, bis(cyclopentadienyl)zirconium di-neopentyl, bis(cyclopentadienyl)titanium dibenzyl, bis(cyciopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl) titanium ethyl chloride bis(cyciopentadienyl)titanium phenyl chloride, bis(cyclopentadienyl)zirconium hydrochloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide, bis(cyclopentadienyl)titanium methyl iodide, bis(cyclopentadienyl)titanium ethyl bromide, bis(cyclopentadienyl) titanium ethyl iodide, bis(cyclopentadienyl)titanium phenyl bromide, bis(cyclopentadienyl)titanium phenyl iodide, bis(cyclopentadienyl)zirconium methyl bromide, bis (cyciopentadienyl)zirconium methyl iodide, bis (cyclopentadienyl)zirconium ethyl bromide, bis (cyclopentadienyl)zirconium ethyl iodide, bis (cyclopentadienyl)zirconium phenyl bromide, bis (cyclopentadienyl)zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafnium trimethyl.

Illustrative, but non-limiting examples of II and III metallocenes which can be usefully employed are monocyclopentadienyls titanocenes such as, pentamethylcyclopentadienyl titanium trichloride, pentamethylcyclopentadienyl titanium trichloride, bis(pentamethylcyclopentadienyl) titanium diphenyl, the carbene represented by the formula bis(cyclopentadienyl)titanium=CH$_2$ and derivatives of this reagent such as bis(cyclopentadienyl)Ti=CH$_2$.Al(CH$_3$)$_3$, (Cp$_2$TiCH$_2$)$_2$, Cp$_2$TiCH$_2$CH(CH$_3$)CH$_2$, Cp$_2$Ti—CH$_2$CH$_2$CH$_2$; substituted bis(Cp)Ti(IV) compounds such as bis(indenyl) titanium diphenyl or dichloride, bis(methylcyclopentadienyl)titanium diphenyl or dihalides; dialkyl, trialkyl, tetra-alkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethylsilyldicyclopentadienyl titanium diphenyl or dichloride, methyl phosphine dicyclopentadienyl titanium diphenyl or dichloride, methylenedicyclopentadienyl titanium diphenyl or dichloride and other complexes described by formulae II and III.

Illustrative but non-limiting examples of the zirconocenes of Formula II and III which can be usefully employed are, pentamethylcyclopentadienyl zirconium trichloride, pentaethylcyclopentadienyl zirconium trichloride, the alkyl substituted cyclopentadienes, such as bis(ethylcyclopentadienyl)zirconium dimethyl, bis(betaphenylpropylcyclopentadienyl) zirconium dimethyl, bis(methylcyclopentadienyl)zirconium dimethyl, bis(n-butylcyclopentadienyl)zirconium dimethyl bis(cyclohexylmethylcyclopentadienyl)zirconium dimethyl bis(n-octylcyclopentadienyl)zirconium dimethyl, and haloalkyl and dihydride, and dihalide complexes of the above; dialkyl, trialkyl, tetra-alkyl, and penta-alkyl cyclopentadienes, such as bis(pentamethylcyclopentadienyl)zirconium diphenyl, bis(pentamethylcyclopentadienyl)zirconium dimethyl, bis(1,2-dimethylcyclopentadienyl)zirconium dimethyl and mono and dihalide and hydride complexes of the above; silicon, phosphorus, and carbon bridged cyclopentadiene complexes such as dimethylsilyidicyclopentadienyl zirconium dimethyl, methyl halide or dihalide, and methylene dicyclopentadienyl zirconium dimethyl, methyl halide, or dihalide. Mono, di and tri-silyl substituted cyclopentadienyl compounds such as bis(trimethylsilylcyclopentadienyl)zirconium dichloride and dimethyl bis(1,3-di-trimethylsilylcyclopentadienyl)zirconium dichloride and dimethyl and bis(1,2,4-tritrimethylsilylcyclopentadienyl)zirconium dichloride and dimethyl. Carbenes represented by the formulae CP$_2$Zr=CH$_2$P(C$_6$H$_5$)$_2$CH$_3$, and derivatives of these compounds such as Cp$_2$ZrCH$_2$CH(CH$_3$)CH$_2$.

Mixed cyclopentadienyl metallocene compounds such as cyclopentadienyl (pentamethyl cyclopentadienyl)zirconium dichloride, (1,3-di-trimethylsilylcyclopentadienyl) (pentamethylcyclopentadienyl) zirconium dichloride, and cyclopentadienyl(indenyl) zirconium dichloride can be employed.

Most preferably, the polymers used in this invention are substantially free of ethylene homopolymer.

Bis(cyclopentadienyl)hafnium dichloride, bis(cyclopentadienyl)hafnium; dimethyl, bis(cyclopentadienyl)vanadium dichloride and the like are illustrative of other metallocenes.

Some preferred metallocenes are bis(cyclopentadienyl)zirconium; dimethyl, bis(cyclopentadienyl)zirconium dichloride; bis(cyclopentadienyl)titanium dichloride; bis(methylcyclopentadienyl) zirconium dichloride; bis(methylcyclopentadienyl)titanium dichloride; bis(n-butylcyclopentadienyl)zirconium dichloride; dimethylsilyldicyclopentadienyl zirconium dichloride; bis(trimethylsilycyclopentadienyl)zirconium dichloride; and dimethylsilyldicyclopentadienyl titanium dichloride; bis(indenyl)zirconium dichloride; bis(4,5,6,7-tetrahydroindenyl)zirconium dichloride; the racemic and/or meso isomer of 1,2-ethylene-bridged bis(4,5,6,7-tetrahydroindenyl)zirconium dichloride; the racemic and/or meso isomer of 1,1-dimethylsilyl-bridged bis(4,5,6,7-tetrahydroindenyl)zirconium dichloride; and the racemic and/or meso isomer of 1,1-dimethylsilyl-bridged bis(methylcyclopentadienyl)zirconium dichloride.

The alumoxane compounds useful in the polymerization process may be cyclic or linear. Cyclic alumoxanes may be represented by the general formula (R—Al—O)$_n$ while linear alumoxanes may be represented by the general formula R(R—Al—O)n'AlR$_2$. In the general formula R is a C$_1$-C$_5$ alkyl group such as, for example, methyl, ethyl, propyl, butyl and pentyl, n is an integer of from 3 to 20, and n' is an integer from 1 to about 20. Preferably, R is methyl and n and n' are 4–18. Generally, in the preparation of alumoxanes from, for example, aluminum trimethyl and water, a mixture of the linear and cyclic compounds is obtained.

The alumoxane can be prepared in various ways. Preferably, they are prepared by contacting water with a solution of aluminum trialkyl, such as, for examples, aluminum trimethyl, in a suitable organic solvent such as toluene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate or ferrous sulfate. Preferably, the alumoxane is prepared in the presence of a hydrated ferrous sulfate. The method comprises treating a dilute solution of aluminum trimethyl in, for example, toluene, with ferrous sulfate represented by the general formula FeSO$_4$.7H$_2$O. The ratio of ferrous sulfate to aluminum trimethyl is desirably about 1 mole of ferrous sulfate for 6 to 7 moles of aluminum trimethyl. The reaction is evidenced by the evolution of methane.

The mole ratio of aluminum in the alumoxane to total metal in the metallocenes which can be usefully employed can be in the range of about 0.5:1 to about 1000:1, and desirably about 1:1 to about 100:1. Preferably, the mole ratio will be in the range of 50:1 to about 5:1 and most preferably 20:1 to 5:1.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Polymerization is generally conducted at temperatures ranging between about 20° and about 300° C., preferably between about 30° and about 200° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation.

The catalyst systems described herein are suitable for the polymerization of olefins in solution over a wide range of pressures. Preferably, the polymerization will be completed at a pressure of from about 10 to about 3,000 bar, and generally at a pressure within the range from about 40 bar to about 2,000 bar, and most preferably, the polymerization will be completed at a pressure within the range from about 50 bar to about 1,500 bar.

After polymerization and, optionally, deactivation of the catalyst (e.g., by conventional techniques such as contacting the polymerization reaction medium with water or an alcohol, such as methanol, propanol, isopropanol, etc., or cooling or flashing the medium to terminate the polymerization reaction), the product polymer can be recovered by processes well known in the art. Any excess reactants may be flashed off from the polymer.

The polymerization may be conducted employing liquid monomer, such as liquid propylene, or mixtures of liquid monomers (such as mixtures of liquid propylene and 1-butene), as the reaction medium. Alternatively, polymerization may be accomplished in the presence of a hydrocarbon inert to the polymerization such as butane, pentane, isopentane, hexane, isooctane, decane, toluene, xylene, and the like.

In those situations wherein the molecular weight of the polymer product that would be produced at a given set of operating conditions is higher than desired, any of the techniques known in the prior art for control of molecular weight, such as the use of hydrogen and/or polymerization temperature control, may be used in the process of this invention. If so desired, the polymerization may be carried out in the presence of hydrogen to lower the polymer molecular weight. Care should be taken to assure that terminal ethenylidene unsaturation is not reduced to less than about 30 percent of the polymer chains.

However, the polymers are preferably formed in the substantial absence of added $H_2$ gas, that is, the absence of $H_2$ gas added in amounts effective to substantially reduce the polymer molecular weight. More preferably, the polymerizations will be conducted employing less than 5 wppm, and more preferably less than 1 wppm, of added $H_2$ gas, based on the moles of the ethylene monomer charged to the polymerization zone.

When carrying out the polymerization in a batch-type fashion, the reaction diluent (if any), ethylene and alpha-olefin comonomer(s) are charged at appropriate ratios to a suitable reactor. Care must be taken that all ingredients are dry, with the reactants typically being passed through molecular sieves or other drying means prior to their introduction into the reactor. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As polymer is being formed, additional monomers may be added to the reactor. Upon completion of the reaction, unreacted monomer and solvent are either flashed or distilled off, if necessary by vacuum, and the low molecular weight copolymer withdrawn from the reactor.

The polymerization may be conducted in a continuous manner by simultaneously feeding the reaction diluent (if employed), monomers, catalyst and cocatalyst to a reactor and withdrawing solvent, unreacted monomer and polymer from the reactor so as to allow a residence time of ingredients long enough for forming polymer of the desired molecular weight and separating the polymer from the reaction mixture.

PREPARATION OF ETHYLENE ALPHA-OLEFIN POLYMER SUBSTITUTED MONO- OR DICARBOXYLIC ACID MATERIAL

The ethylene alpha-olefin polymer substituted mono- or dicarboxylic acid material, i.e., acid, anhydride or acid ester of this invention, includes the reaction product of ethylene alpha-olefin polymer with a monounsaturated carboxylic reactant comprising at least one member selected from the group consisting of (i) monounsaturated $C_4$ to $C_{10}$ dicarboxylic acid wherein (a) the carboxyl groups are vicinyl, (i.e. located on adjacent carbon atoms) and (b) at least one, preferably both, of said adjacent carbon atoms are part of said mono unsaturation; (ii) derivatives of (i) such as anhydrides or $C_1$ to $C_5$ alcohol derived mono-or di-esters of (i); (iii) monounsaturated $C_3$ to $C_{10}$ monocarboxylic acid wherein the carbon-carbon double bond is allylic to the carboxy group, i.e, of the structure

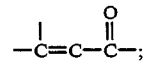

and (iv) derivatives of ( iii ) such as $C_1$ to $C_5$ alcohol derived mono- or di-esters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain unreacted polymer. The unreacted polymer is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polymer charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polymer contained in the resulting product mixture can be subsequently modified, i.e. increased or decreased by techniques known in the art, such modifications do not alter functionality as defined above. The terms ethylene-alpha-olefin polymer substituted monocarboxylic acid material and ethylene-alpha-olefin polymer substituted dicarboxylic acid material are intended to refer to the product mixture whether it has undergone such modification or not.

Accordingly, the functionality of the ethylene-alpha-olefin polymer substituted mono- and dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

The polymer can be reacted with the monounsaturated carboxylic reactant by a variety of methods. For example, the polymer can be first halogenated, chlorinated or brominated to about 0.05 to 2 wt. %, preferably 0.1 to 1 wt. % chlorine, or bromine, based on the weight of polymer, by passing the chlorine or bromine through the polymer at a temperature of 60° to 250° C., preferably 110° to 160° C., e.g. 120° to 140° C., for about 0.5 to 10, preferably 1 to 7 hours. The halogenated polymer may then be reacted with sufficient monounsaturated carboxylic reactant at 100° to 250° C., usually about 180° to 235° C., for about 0.5 to 10, e.g. 3 to 8 hours, so the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

While chlorination normally helps increase the reactivity of polyolefins with monounsaturated carboxylic reactant, it is not necessary with the present polymers due to their high terminal bond content and reactivity. Preferably, therefore, the polymer and the monounsaturated carboxylic reactant are contacted at elevated temperature to cause a thermal "ene" reaction to take place. Thermal "ene" reactions have been heretofore described in U.S. Pat. Nos. 3,361,673 and 3,401,118, the disclosures of which are hereby incorporated by reference in their entirety. It has been surprisingly found that the terminally ethylenically-unsaturated ethylene alpha-olefin polymers used in this invention readily undergo such thermal "ene" reactions under conditions in which the formation of sediment, or other by-products contributing to product haze, is greatly minimized or avoided altogether. The improved low sediment ene reaction product mixture is preferably formed using a polymer (more preferably, ethylene-propylene copolymers) having a number average molecular weight of from greater than 20,000 to about 500,000, preferably from about 25,000 to about 200,000, more preferably from about 30,000 to about 100,000, and most preferably from about 35,000 to about 50,000, and a polydispersity of less than about 4, preferably less than about 3, e.g., from 1.1 to 3.5, most preferably from 1.2 to 3.

In this process, the selected polymer and monounsaturated carboxylic reactant are contacted for a time and under conditions effective to form the desired ethylene alpha-olefin polymer substituted mono- or dicarboxylic acid material. Generally, the polymer and monounsaturated carboxylic reactant will be contacted in a polymer to unsaturated carboxylic reactant mole ratio usually from about 1:1 to 1:10, and preferably from about 1:1 to 1:5, at an elevated temperature, generally from about 120° to 260° C., preferably from about 160° to 240° C. The reaction will be generally carried out, with stirring for a time of from about 1 to 20 hours, preferably from about 2 to 6 hours. The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The polymer substituted mono- or dicarboxylic acid material thus formed can be recovered from the liquid reaction mixture, e.g., after stripping the reaction mixture, if desired, with an inert gas such as $N_2$ to remove unreacted unsaturated carboxylic reactant.

The "ene" reaction product mixture thereby obtained has been surprisingly found to have a substantially reduced content of sediment or other solid by-products as impurities and can be employed, without filtering, centrifuging, clarification, phase separation or other conventional product purification treatments, as, e.g., an additive to lubricating oils or as intermediate in the preparation of derivative products for use in lubricating oils, as will be more completely described hereinafter.

The ene reaction product mixture is further improved by being substantially free of chlorine, that is, by having a chlorine content of less than about 25 ppm by weight, preferably less than about 10 ppm by weight.

A further advantage of the ethylene alpha-olefin polymer substituted mono- or dicarboxylic acid material of the instant invention is that by conducting the reaction, i.e., "ene" reaction, of the ethylene alpha-olefin polymer and the monounsaturated carboxylic reactant in a solvent such as mineral oil, the resultant functionalized reaction product (containing the ethylene alpha-olefin polymer substituted mono- or dicarboxylic acid material) is substantially free of by-product comprising solvent, e.g., oil, reacted with the monounsaturated carboxylic reactant, e.g., oil-succinic anhydride, which generally is formed when a free radical grafting process is conducted in a solvent such as oil.

The ene reaction product mixture comprising the desired ethylene-alpha-olefin substituted mono- or dicarboxylic acid material (e.g., ethylene-propylene polymer-substituted succinic anhydride) formed by the process of this invention will generally contain unreacted polymer, (that is, polymer which is unsubstituted by the mono- or dicarboxylic acid moiety), in a concentration of less than about 40 wt. % (e.g., from 5 to 35 wt. %), more preferably less than about 30 wt. % (e.g from 10 to 25 wt. %).

It will be understood that the ethylene alpha-olefin polymers of this invention which are charged to the alkylation reaction zone can be charged alone or together with (e.g., in admixture with) other polyalkenes derived from alkenes having from 1 to 20 carbon atoms (butene, pentene, octene, decene, dodecene, tetradodecene and the like) and homopolymers of $C_3$ to $C_{10}$, e.g., $C_2$ to $C_5$, monoolefins, and copolymers of $C_2$ to $C_{10}$, e.g., $C_2$ to $C_5$, monoolefins, said additional polymer having a number average molecular weight of at least about 900, and a molecular weight distribution of less than about 4.0, preferably less than about 3.0 (e.g, from 1.2 to 2.8). Preferred such additional olefin polymers comprise a major molar amount of $C_2$ to $C_{10}$, e.g. $C_2$ to $C_5$ monoolefin. Such olefins include ethylene, propylene, butylene, isobutylene, pentene, octene-1, styrene, etc. Exemplary of the additionally charged homopolymers is polypropylene, polyisobutylene, and poly-n-butene the like as well as interpolymers of two or more of such olefins such as copolymers of: ethylene and propylene (prepared by conventional methods other than as described above for the preferred ethylene alpha-olefin copolymers employed in this invention, that is, ethylene-propylene copolymers which are substantially saturated, wherein less than about 10 wt. % of the polymer chains contain ethylenic unsaturation); butylene and isobutylene; propylene and isobutylene; etc. Other copolymers include those in which a minor molar amount of the copolymer monomers, e.g., 1 to 10 mole % is a $C_4$ to $C_{18}$ non-conjugated diolefin, e.g., a copolymer of isobutylene and butadiene: or a copolymer of ethylene, propylene and 1,4-hexadiene; etc. An especially useful additional such polymer is polyisobutylene. Preferred are mixtures of such polyisobutylene with ethylene-propylene copolymers wherein at least 30 wt. % of the copolymer chains contain terminal ethenylidene monounsaturation as described above.

PREPARATION OF NUCLEOPHILICALLY-SUBSTITUTED DERIVATIVE PRODUCTS

The ethylene alpha-olefin polymer substituted mono- or dicarboxylic acid materials, e.g., ethylene-propylene substituted carboxylic acids/ anhydrides/esters, of this invention, prepared as described above, can be contacted with a nucleophilic reactant, e.g., amines, alcohols, including polyols, amino-alcohols, reactive metal compounds, etc. to form the novel viscosity index improvers-dispersants of this invention.

Amine compounds useful as nucleophilic reactants for reaction with the polymer substituted mono- or dicarboxylic acid materials include mono- and (preferably) polyamines, of about 2 to 60, preferably 2 to 40 (e.g. 3 to 20), total carbon atoms and about 1 to 12, preferably 3 to 12, and most preferably 3 to 9 nitrogen atoms in the molecule. These amines may be hydrocarbyl amines or may be hydrocarbyl amines including other groups, e.g, hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are those containing at least two reactive amino groups selected from primary amino groups, secondary amino groups and mixtures thereof. Preferred amines are aliphatic saturated amines, including those of the general formulas:

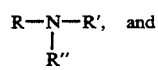
(Va)

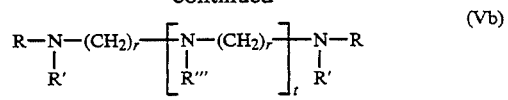

wherein R, R', R" and R'" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R'" can additionally comprise a moiety of the formula:

wherein R' is as defined above, and wherein r and r' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R'", r, r', t and t' be selected in a manner sufficient to provide the compounds of Formulas Va and Vb with typically at least one primary or secondary amine group, preferably at least two primary or secondary amine groups. This can be achieved by selecting at least one of said R, R', R" or R'" groups to be hydrogen or by letting t in Formula Vb be at least one when R'" is H or when the VI moiety possesses a secondary amino group, The most preferred amine of the above formulas are represented by Formula Vb and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine: diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (VII):

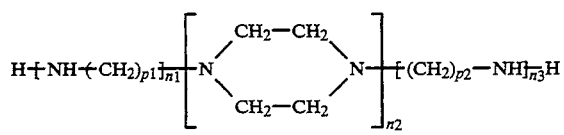

wherein $P_1$ and $P_2$ are the same or different and are each integers of from 1 to 4, and $n_1$, $n_2$ and $n_3$ are the same or different and are each integers of from 1 to 3. Non-limiting examples of such amines include 2-pentadecyl imidazoline; N-(2-aminoethyl) piperazine; etc. Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formula (VIII):

$$NH_2\text{—alkylene}\text{\textsf{+}}O\text{—alkylene}\text{\textsf{)}}_m NH_2$$

where m has a value of about 3 to 70 and preferably 10 to 35; and the formula (IX):

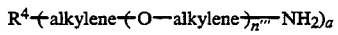

$$R^4\text{\textsf{+}}\text{alkylene}\text{\textsf{+}}O\text{—alkylene}\text{\textsf{)}}_{n'''}\text{—}NH_2)_a$$

where n''' has a value of about 1 to 40 with the provision that the sum of all the n''' values is from about 3 to about 70 and preferably from about 6 to about 35, and $R^4$ is a polyvalent saturated hydrocarbon radical of up to ten carbon atoms wherein the number of substituents on the $R^4$ group is represented by the value of "a", which is a number of from 3 to 6. The alkylene groups in either formula (VII) or (IX) may be straight or branched chains containing about 2 to 7, and preferably about 2 to 4 carbon atoms.

The polyoxyalkylene polyamines of formulas (VII) or (IX) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

A particularly useful class of amines are the polyamido and related amines disclosed in U.S. Pat. No. 4,857,217, which comprise reaction products of a polyamine and an alpha, beta unsaturated compound of the formula:

$$\begin{array}{c} R^6\ R^7\ X \\ |\ \ |\ \ || \\ R^5\text{—C=C—C—Y} \end{array} \quad (X)$$

wherein X is sulfur or oxygen, Y is $-OR^8$, $-SR^8$, or $-NR^8(R^9)$, and $R^5$, $R^6$, $R^7$, $R^8$ and $R^9$ are the same or different and are hydrogen or substituted or unsubstituted hydrocarbyl. Any polyamine, whether aliphatic, cycloaliphatic, aromatic, heterocyclic, etc., can be employed provided it is capable of adding across the acrylic double bond and amidifying with for example the carbonyl group (—C(O)—) of the acrylate-type compound of formula X, or with the thiocarbonyl group (—C(S)—) of the thioacrylate-type compound of formula X.

When $R^5$, $R^6$, $R^7$, $R^8$ or $R^9$ in Formula X are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of $R^5$ through $R^9$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $R^5$ through $R^9$ are aryl, the aryl group will generally contain from 6 to 10 carbon atoms (e.g., phenyl, naphthyl).

When one or more of $R^5$ through $R^9$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of $R^5$ through $R^9$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of $R^5$ and $R^9$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $R^5$ through $R^9$ are heterocyclic, the heterocyclic group generally consists of a compound having at least one ring of 6 to 12 members in which on or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

$$\begin{array}{c} R^6\ R^7\ O \\ |\ \ |\ \ || \\ R^5\text{—C=C—C—}OR^8 \end{array} \quad (XI)$$

wherein $R^5$, $R^6$, $R^7$, and $R^8$ are the same or different and are hydrogen or substituted or unsubstituted hydrocarbyl as defined above. Examples of such alpha, beta-ethylenically unsaturated carboxylate compounds of formula XI are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3- dimethyl-2-butenoate, methyl 3-phenyl-2-propenoate, and the like.

The alpha, beta ethylenically unsaturated carboxylate thioester compounds employed herein have the following formula:

(XII)

wherein $R^5$, $R^6$, $R^7$, and $R^8$ are the same or different and are hydrogen or substituted or unsubstituted hydrocarbyl as defined above. Examples of such alpha, beta-ethylenically unsaturated carboxylate thioesters of formula XII are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate, and the like.

The alpha, beta ethylenically unsaturated carboxyamide compounds employed herein have the following formula:

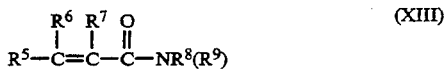
(XIII)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated carboxyamides of formula XIII are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl -2-pentenamide, N-methyl 2-butenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2 -propenamide, 2-methyl-2-propenamide, 2-ethyl-2-propenamide and the like.

The alpha, beta ethylenically unsaturated thiocarboxylate compounds employed herein have the following formula:

(XIV)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxylate compounds of formula XIV are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

(XV)

wherein $R^5$, $R^6$, $R^7$, and $R^8$ are the same or different and are hydrogen or substituted or unsubstituted hydrocarbyl as defined above. Examples of alpha, beta-ethylenically unsaturated dithioic acids and acid esters of formula XV are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

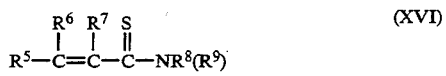
(XVI)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxyamides of formula XVI are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

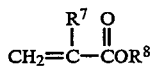
(XVII)

where $R^7$ is hydrogen or a $C_1$ to $C_4$ alkyl group, such as methyl, and $R^8$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate. When the selected alpha, beta-unsaturated compound comprises a compound of formula X wherein X' is oxygen, the resulting reaction product with the polyamine contains at least one amido linkage (—C(O)N<) and such materials are herein termed "amido-amines." Similarly, when the selected alpha, beta unsaturated compound of formula X comprises a compound wherein X' is sulfur, the resulting reaction product with the polyamine contains thioamide linkage (—C(S)N<) and these materials are herein termed "thioamido-amineso". For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula X tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10-300%, or greater, for example, 25-200%, is employed. For more efficient cross-linking an excess of carboxylated material should preferably be used since a cleaner reaction ensues. For example, a molar excess of about 10-100% or greater such as 10-50%, but preferably an excess of 30-50%, of the carboxylated material. Larger excess can be employed if desired.

In summary, without considering other factors, equimolar amounts of reactants tend to produce a more linear amido-amine whereas excess of the formula XII reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

has more labile hydrogens than ethylene diamine.

These amido-amine adducts so formed are characterized by both amido and amino groups. In their simplest embodiments they may be represented by units of the following idealized formula (XVIII):

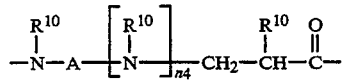

wherein the $R^{10}$s, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and $n_4$ is an integer such as 1–10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines employed in this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula X are contacted in an amount of from about 1 to 10, more preferably from about 2 to 6, and most preferably from about 3 to 5, equivalents of primary amine in the polyamine reactant per mole of the unsaturated reactant of formula X.

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80°–90° C., for a suitable period of time, such as a few hours. Where an acrylic-type ester is employed, the progress of the reaction can be judged by the removal of the alcohol in forming the amide. During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yield of at least 95% are generally obtained.

Similarly, it will be understood that the reaction of an ethylenically unsaturated carboxylate thioester of formula XII liberates the corresponding $HSR^8$ compound (e.g., $H_2S$ when $R^8$ is hydrogen) as a by-product, and the reaction of an ethylenically unsaturated carboxyamide of formula XIII liberates the corresponding $HNR^8(R^9)$ compound (e.g., ammonia when $R^8$ and $R^9$ are each hydrogen) as by-product.

The reaction time involved can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed.

Although one can employ a solvent, the reaction can be run without the use of any solvent. In fact, where a high degree of cross-linking is desired, it is preferably to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene pentamine (TEPA) with methyl methacrylate can be illustrated as follows:

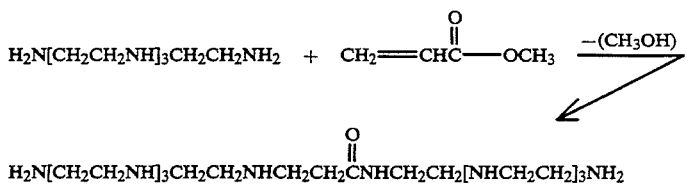

PREPARATION OF THE VISCOSITY INDEX IMPROVER-DISPERSANT

The amine is readily reacted with the selected material, e.g., the ethylene-propylene copolymer substituted succinic anhydride, by reacting an oil solution containing 5 to 95 wt. % of the polymer substituted mono- or dicarboxylic acid material at about 100° to 250° C., preferably 125° to 175° C., generally for 1 to 10, e.g., 2 to 6 hours until the desired amount of water is removed. The heating is preferably carried out to favor formation of imides or mixtures of imides and amides, rather than amides and salts.

Reaction ratios of polymer substituted mono- and dicarboxylic acid material to equivalents of amine as well as the other nucleophilic reactants described herein can vary considerably, depending on the reactants and type of bonds formed. When the polymer comprises a polymer substituted dicarboxylic acid material, containing dicarboxylic acid producing moieties derived from any of the above monounsaturated dicarboxylic acids, or anhydride or ester derivatives thereof, generally from 0.05 to 1.0, preferably from about 0.1 to 0.6, e.g., 0.2 to 0.4, moles of dicarboxylic acid moiety content (e.g., grafted maleic anhydride content) is used, per equivalent of nucleophilic reactant, e.g., amine. For example, about 0.8 mole of a pentamine (having two primary amino groups and 5 equivalents of nitrogen per molecule) is preferably used to convert into a mixture of amides and imides, the product formed by reacting one mole of polymer with sufficient maleic anhydride to add 1.6 moles of succinic anhydride groups per mole of polymer, i.e., preferably the pentamine is used in an amount sufficient to provide about 0.4 mole (that is 1.6/[0.8×5] mole) of succinic anhydride moiety per nitrogen equivalent of the amine. If an amido-amine, as above, is employed, generally from 1 to 5, preferably from about 1.5 to 3 moles of dicarboxylic acid moiety content (e.g., grafted maleic anhydride content) is used per equivalent of amido-amine reactant, e.g., amine.

When the polymer comprises a polymer substituted monocarboxylic acid material, containing monocarboxylic acid producing moieties derived from any of the above monounsaturated monocarboxylic acids, or ester derivatives thereof, generally from 0.05 to 1.0, preferably from about 0.1 to 0.6, e.g., 0.2 to 0.4, moles of monocarboxylic acid moiety content (e.g., grafted acrylic acid content) is used, per equivalent of nucleophilic reactant, e.g., amine. If an amido-amine, as above, is employed, generally from 1 to 5, preferably from about 1.5 to 3 moles of monocarboxylic acid moiety content (e.g., grafted acrylic acid content) is used per equivalent of amido-amine reactant, e.g., amine.

An example of the reaction of an amido-amine reactant with a polymer mono- or dicarboxylic acid producing reactant is the reaction of ethylene-propylene copolymer substituted succinic anhydride (EPSA) with a polyamido-amine having two terminal —$NH_2$ groups, which can be illustrated as follows:

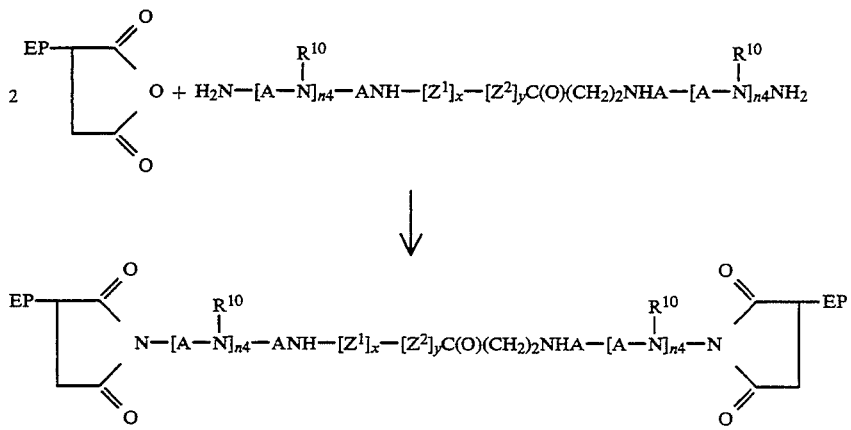

wherein x and y are each integers of from 0 to 10, EP represents an ethylene-propylene copolymer group as described above, $Z^1$ and $Z^2$ are moieties of the formula:

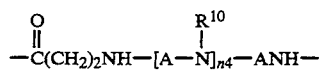

wherein $R^{10}$, A and $n_4$ are as defined above for Formula XVIII. Preferred are amido-amine reaction products of the above equation wherein $R^{10}$ is H, and most preferably wherein x and y are each zero, and A is —$(CH_2)_2$— or —$(CH_3H_7)$—.

It will be understood that the amine reactant can comprise one or a mixture of any of the above described amines, such as a mixture of an amido-amine and a polyalkylene polyamine. Preferably, the polymer substituted mono- or dicarboxylic acid producing material and amine will be contacted for a time and under conditions sufficient to react substantially all of the primary nitrogens in the amine reactant. The progress of this reaction can be followed by infrared analysis.

The viscosity index improver-dispersant forming reaction can be conducted in a polar or non-polar solvent (e.g., xylene, toluene, benzene and the like), and is preferably conducted in the presence of a mineral or synthetic lubricating oil.

Tris(hydroxymethyl) amino methane (THAM) can be reacted with the aforesaid polymer substituted acid material to form amides, imides or ester type additives as taught by U.K. 984,409, or to form oxazoline compounds and borated oxazoline compounds as described, for example, in U.S. Pat. No. 4,102,798; 4,116,876 and 4,113,639.

The viscosity index improver-dispersants may also be esters derived from the aforesaid ethylene alpha-olefin polymer substituted mono- or dicarboxylic acid material and from hydroxy compounds such as monohydric and polyhydric alcohols or aromatic compounds such as phenols and naphthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, and mixtures thereof.

The ester viscosity index improver-dispersant may also be derived from unsaturated alcohols such as allyl alcohol, cinnamyl alcohol, propargyl alcohol, 1-cyclohexane-3-ol, and oleyl alcohol. Still other classes of the alcohols capable of yielding the esters of this invention comprise the ether-alcohols and amino-alcohols including, for example, the oxy-alkylene, oxy-arylene-, amino-alkylene-, and amino-arylene-substituted alcohols having one or more oxy-alkylene, amino-alkylene or amino-arylene oxy-arylene radicals. They are exemplified by Cellosolve, Carbitol, N,N,N',N'-tetrahydroxy-trimethylene di-amine, and ether-alcohols having up to about 150 oxy-alkylene radicals in which the alkylene radical contains from 1 to about 8 carbon atoms.

The ester viscosity index improver-dispersant may be di-esters of succinic acids or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester viscosity index improver-dispersant may be prepared by one of several known methods as illustrated for example in U.S. Pat. No. 3,381,022. The ester viscosity index improver-dispersant may also be borated, similar to the nitrogen containing viscosity index improver-dispersants, as described above.

Hydroxyamines which can be reacted with the aforesaid ethylene alpha-olefin polymer substituted dicarboxylic acid material to form viscosity index improver-dispersants include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propane-diol, 2-amino-2-ethyl-1,3-propanediol, N-(beta-hydroxypropyl)-N'-(beta-amino-ethyl)-piperazine, tris(-hydroxymethyl) aminomethane (also known as trismethylolaminomethane), 2-amino-1-butanol, ethanolamine, beta-(beta-hydroxyethoxy)ethylamine, and the like. Mixtures of these or similar amines can also be employed. The above description of nucleophilic reactants suitable for reaction with the ethylene alpha-olefin polymer substituted dicarboxylic acid or anhydride includes amines, alcohols, and compounds of mixed amine and hydroxy containing reactive functional groups, i.e., amino-alcohols.

Reactive metals or reactive metal compounds useful for reaction with the ethylene-alpha-olefin polymer substituted mono- and dicarboxylic acid materials of this invention are those which will form carboxylic acid metal salts with the ethylene-alpha-olefin polymer substituted mono- and dicarboxylic acid materials of this invention and those which will form metal-containing complexes with such dispersant derivative compositions produced by reacting the ethylene-alpha-olefin polymer substituted mono- and dicarboxylic acid materials with amines and/or alcohols as discussed above. Reactive metal compounds useful for the formation of such complexes are disclosed in U.S. Pat. No. 3,306,908. Complex-forming metal reactants include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt, nickel, copper and zinc). These metals are the so-called transition or coordination metals, i.e., they are capable of forming complexes by means of their secondary or coordination ordination valence. Specific examples of the complex-forming metal compounds useful as the reactant in this invention are cobaltous nitrate, cobaltous oxide, cobaltic oxide, cobalt nitrite, cobaltic phosphate, cobaltous chloride, cobaltic chloride, cobaltous carbonate, chromous acetate, chromic acetate, chromic bromide, chromous chloride, chromic fluoride, chromous oxide, chromium dioxide, chromic oxide, chromic sulfite, chromous sulfate heptahydrate, chromic sulfate, chromic formate, chromic hexanoate, chromium oxychloride, chromic phosphite, manganous acetate, manganous benzoate, manganous carbonate, manganese dichloride, manganese trichloride, manganous citrate, manganous formate, manganous nitrate, manganous oxalate, manganese monooxide, manganese dioxide, manganese trioxide, manganese heptoxide, manganic phosphate, manganous pyrophosphosate, manganic metaphosphate, manganous hypophosphite, manganous valerate, ferrous acetate, ferric benzoate, ferrous bromide, ferrous carbonate, ferric formate, ferrous lactate, ferrous nitrate, ferrous oxide, ferric oxide, ferric hypophosphite, ferric sulfate, ferrous sulfite, ferric hydrosulfite, nickel dibromide, nickel dichloride, nickel nitrate, nickel dioleate, nickel stearate, nickel sulfite, cupric propionate, cupric acetate, cupric metaborate, cupric benzoate, cupric formate, cupric laurate, cupric nitrite, cupric oxychloride, cupric palmitate, cupric salicylate, zinc benzoate, zinc borate, zinc bromide, zinc chromate, zinc dichromate, zinc iodide, zinc lactate, zinc nitrate, zinc oxide, zinc stearate, zinc sulfite, cadmium benzoate, cadmium carbonate, cadmium butyrate, cadmium chloroactate, cadmium, fumerate, cadmium nitrate, cadmium dihydrogenphosphate, cadmium sulfite, and cadmium oxide. Hydrates of the above compounds are especially convenient for use in the process of this invention.

U.S. Pat. No. 3,306,908 is expressly incorporated herein by reference for its discussion of reactive metal compounds suitable for forming such complexes and its disclosure of processes for preparing the complexes. Basically, those processes are applicable to the viscosity index improver-dispersant derivative compositions of the ethylene-alpha-olefin polymer substituted mono- and dicarboxylic acid materials of this invention with the amines as described above by substituting, or on an equivalent basis, the ethylene-alpha-olefin polymer substituted mono- and dicarboxylic acid materials of this invention with the high molecular weight carboxylic acid acylating agents disclosed in U.S. Pat. No. 3,306,908. The ratio of equivalents of the acylated amine thus produced and the complex-forming metal reactant remains the same as disclosed in 3,306,908.

U.S. Reissue Pat. No. 26,433 discloses metals useful in preparing salts from the dispersant derivative compositions of the ethylene-alpha-olefin polymer substituted mono- and dicarboxylic acid materials of this invention and amines as described hereinabove. Metal salts are prepared, according to this patent, from alkali metals, alkaline earth metals, zinc, cadmium, lead, cobalt and nickel. Examples of a reactive metal compound suitable for use herein are sodium oxide, sodium hydroxide, sodium carbonate, sodium methylate, sodium propylate, sodium pentylate, sodium phenoxide, potassium oxide, potassium hydroxide, potassium carbonate, potassium methylate, potassium pentylate, potassium phenoxide, lithium oxide, lithium hydroxide, lithium carbonate, lithium pentylate, calcium oxide, calcium hydroxide, calcium carbonate, calcium methylate, calcium ethylate, calcium propylate, calcium chloride, calcium fluoride, calcium pentylate, calcium phenoxide, calcium nitrate, barium oxide, barium hydroxide, barium caronate, barium chloride, barium fluoride, barium methylate, barium propylate, barium pentylate, barium nitrate, magnesium oxide, magnesium hydroxide, magnesium carbonate, magnesium ethylate, magnesium propylate, magnesium chloride, magnesium bromide, barium, iodide, magnesium phenoxide, zinc oxide, zinc hydroxide, zinc carbonate, zinc methylate, zinc propylate, zinc pentylate, zinc chloride, zinc fluoride, zinc nitrate trihydrate, cadmium oxide, cadmium hydroxide, cadmium carbonate, cadmium methylate, cadmium propylate, cadmium chloride, cadmium bromide, cadmium fluoride, lead oxide, lead hydroxide, lead carbonate, lead ethylate, lead pentylate, lead chloride, lead fluoride lead iodide, lead nitrate, nickel oxide, nickel hydroxide, nickel carbonate, nickel chloride, nickel bromide, nickel fluoride, nickel methylate, nickel pentylate, nickel nitrate hexahydrate, cobalt oxide, cobalt hydroxide, cobaltous bromide, cobaltous chloride, cobalt butylate, cobaltous nitrate hexahydrate, etc. The above metal compounds are merely illustrative of those useful in this invention and the invention is not to be considered as limited to such.

U.S. Reissue 26,433 is expressly incorporated herein by reference for its disclosure of reactive metal compounds useful herein and processes for utilizing these compounds in the formation of salts. Again, in applying the teachings of this patent to the present invention, it is only necessary to substitute the ethylene-alpha-olefin polymer substituted mono- and dicarboxylic acid materials of this invention on an equivalent weight basis for the high molecular weight carboxylic acylating agents of the reissue patent.

U.S. Pat. No. 3,271,310 discloses the preparation of metal salt of high molecular weight carboxylic acid acylating agents, in particular alkenyl succinic acids. The metal salts disclosed therein are acid salts, neutral salts, and basic salts. Among the illustrative reactive metal compounds used to prepare the acidic, neutral and basic salts of the high molecular weight carboxylic acids disclosed in U.S. Pat. No. 3,271,310 are lithium oxide, lithium hydroxide, lithium carbonate, lithium pentylate, sodium oxide, sodium hydroxide, sodium carbonate, sodium methylate, sodium propylatr, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentylate, nickel oxide, nickel hydroxide, and nickel carbonate. The present invention is not to be considered as limited to the use of the above metal compounds; they are presented merely to illustrate the metal compounds included within the invention.

U.S. Pat. No. 3,271,310 is expressly incorporated herein by reference for its disclosure of suitable reactive metal compounds for forming salts of the ethylene-alpha-olefin polymer substituted mono- and dicarboxylic acid materials of this invention as well as illustrative processes for preparing salts of these materials. As will be apparent, the processes of U.S. Pat. No. 3,271,310 are applicable to the polymer substituted materials of this invention merely by substituting on an equivalent weight basis, the ethylene-alpha-olefin polymer substituted mono- and dicarboxylic acid materials of this invention for the high molecular weight carboxylic acids of the patent.

From the foregoing description, it is apparent that the ethylene-alpha-olefin polymer substituted mono- and dicarboxylic acid materials of this invention can be reacted with any individual amine, alcohol, reactive metal, reactive metal compound or any combination of two or more of any of these; that is, for example, one or more amines, one or more alcohols, one or more reactive metals or reactive metal compounds, or a mixture of any of these. The mixture can be a mixture of two or more amines, a mixture of two or more alcohols, a mixture of two or more metals or reactive metal compounds, or a mixture of two or more components selected from amines and alcohols, from amines and reactive metals or reactive metal compounds, from alcohols and reactive metals compounds, or one or more components from each of the amines, alcohols, and reactive metal or reactive metal compounds. Furthermore, the ethylene-alpha-olefin polymer substituted mono- and dicarboxylic acid materials of this invention can be reacted with the amines, alcohols, reactive metals, reactive metal compounds, or mixtures thereof, as described above, simultaneously (concurrently) or sequentially in any order of reaction.

Canadian Patent 956,397 is expressly incorporated herein by reference for its disclosure of procedures for reacting the ethylene-alpha-olefin polymer substituted mono- and dicarboxylic acid materials of this invention with amines, alcohols, reactive metal and reactive metal compounds, or mixtures of these, sequentially and simultaneously. All that is required to apply the processes of that patent to this invention is to substitute, on an equivalent weight basis, the ethylene-alpha-olefin polymer substituted mono- and dicarboxylic acid materials of this invention for the high molecular weight carboxylic acid acylating agents disclosed in that Canadian patent. Carboxylic acid derivatives of this invention prepared utilizing the processes disclosed in the Canadian patent constitute a preferred class of carboxylic acids or carboxylic acid derivative compositions. The following U.S. Pat. Nos. are also incorporated herein by reference, being counterparts of the incorporated Canadian patent, for the same reasons given for incorporating the Canadian patent: 3,836,469; 3,836,470; 3,836,471; 3,838,050; 3,838,052; 3,879,308; 3,957,854; 3,957,855. The Canadian patent and the U.S. patents are also incorporated herein to illustrate that the amount of polyoxyalkylene alcohol demulsifier utilized in preparing dispersant/detergents from the ethylene-alpha-olefin polymer substituted mono- and dicarboxylic acid materials of this invention is normally quite small on an equivalent basis.

It is also pointed out that, among the more preferred carboxylic derivative compositions of this invention are those prepared according to the Canadian patent and corresponding U.S. patent and application identified above in which the polyoxyalkylene alcohol demulsifier has been omitted. In other words, a preferred class of carboxylic derivative compositions of this invention are the various reaction products of the high molecular weight carboxylic acid acylating agents of the Canadian patent with one or more amines, alcohols, and reactive metal compounds as disclosed therein differing only in that the ethylene-alpha-olefin polymer substituted mono- and dicarboxylic acid materials of this invention are substituted on an equivalent weight basis and, further, that the polyoxyalkylene alcohol demulsifier reactant is omitted.

In addition, U.S. Pat. No. 3,806,456 is expressly incorporated herein by reference for its disclosure of processes useful in preparing products from the ethylene-alpha-olefin polymer substituted mono- and dicarboxylic acid materials of this invention and polyoxyalkylene polyamines as described hereinbefore. Substitution of the ethylene-alpha-olefin polymer substituted mono- and dicarboxylic acid materials of this invention for the high molecular weight carboxylic acid acylating agents disclosed in U.S. Pat. No. 3,806,456 on an equivalent weight basis produces compounds of similar utility further characterized by the desired viscosity index improving properties discussed hereinbefore.

U.S. Pat. No. 3,576,743 is also incorporated herein by reference for its disclosure of a process for preparing carboxylic derivative compositions from both polyhydric alcohols and amine; in particular, hydroxy-substituted primary amines. Again, substitution of the ethylene-alpha-olefin polymer substituted mono- and dicarboxylic acid materials of this invention on an equivalent weight basis for the high molecular carboxylic acid acylating agents disclosed in U.S. Pat. No. 3,576,743 provides compositions having the desired dispersant/detergent compositions and the V.I. improving properties already discussed.

U.S. Pat. No. 3,632,510 is expressly incorporated herein by reference for its disclosure of processes for preparing mixed ester-metal salts. Mixed ester-metal salts derived from ethylene-alpha-olefin polymer substituted mono- and dicarboxylic acid materials of this invention, the alcohols, and the reactive metal compounds can be prepared by following the processes disclosed in U.S. Pat. No. 3,632,510 but substituting, on an equivalent weight basis, the ethylene-alpha-olefin polymer substituted mono- and dicarboxylic acid materials of this invention for the high molecular weight carboxylic acid acylating agents of the patent. The carboxylic acid derivative compositions thus produced also represent a preferred aspect of this invention.

Finally, U.S. Pat. Nos. 3,755,169; 3,804,763; 3,868,330; and 3,948,800 are expressly incorporated herein by reference for their disclosure of how to prepare carboxylic acid derivative compositions. By following the teachings of these patents and substituting the ethylene-alpha-olefin polymer substituted mono- and dicarboxylic acid materials of this invention for the high molecular weight carboxylic acylating agents of the patents, a wide range of carboxylic derivative compositions within the scope of the present invention can be prepared.

Incorporation of so many patents is done for the sake of brevity and because, it is felt, that the procedures necessary to prepare the carboxylic derivative compositions from the ethylene-alpha-olefin polymer substituted mono- and dicarboxylic acid materials and the amines, alcohols, and reactive metals and reactive metal compounds, as well as mixtures thereof, is well within the skill of the art, such that a detailed description herein is not necessary.

A preferred group of multifunctional viscosity index improvers, e.g., viscosity index improvers-dispersants, are those derived from ethylene-propylene copolymer substituted with succinic anhydride groups and reacted with polyethylene amines (referred to herein as "EPSA"), e.g., tetraethylene pentamine, pentaethylene hexamine, polyoxyethylene and polyoxypropylene amines, e.g., polyoxypropylene diamine, trismethylolaminomethane and pentaerythritol, and combinations thereof. One particularly preferred viscosity index improver-dispersant combination involves a combination of (A) ethylene-propylene copolymer substituted with succinic anhydride groups and reacted with (B) a hydroxy compound, e.g., pentaerythritol, (C) a polyoxyalkylene polyamine, e.g., polyoxypropylene diamine, and (D) a polyalkylene polyamine, e.g. polyethylene diamine and tetraethylene pentamine using about 0.3 to about 2 moles each of (B) and (D) and about 0.3 to about 2 moles of (C) per mole of (A). Another preferred viscosity index improver-dispersant combination involves the combination of (A) ethylene-propylene copolymer succinic anhydride with (B) a polyalkylene polyamine, e.g.. tetraethylene pentamine, and (C) a polyhydric alcohol or polyhydroxy-substituted aliphatic primary amine, e.g., pentaerythritol or trismethylolaminomethane.

Another embodiment of the instant invention is directed to a functionalized ethylene alpha-olefin polymer, i.e., ethylene alpha-olefin substituted mono- or dicarboxylic acid material, exhibiting viscosity index improving properties and enhanced dispersant efficacy.

This embodiment, while generally applicable to all the polymers of the instant invention, is particularly useful with polymers having a number average molecular weight above about 50,000, i.e., from about 50,000 to about 400,000, preferably from about 50,000 to about 200,000, and more preferably from about 50,000 to about 100,000.

In this embodiment an ethylene alpha-olefin polymer substituted mono- or dicarboxylic acid material is prepared substantially as described hereinafore. This ethylene alpha-olefin polymer substituted with mono- or dicarboxylic acid material is further substituted or reacted with additional mono- or dicarboxylic acid material. This further substitution or reaction of the ethylene alpha-olefin polymer may be carried out by conventional and well-known means such as thermally or, more preferably, by use of a free-radical initiator such as peroxide. Such free-radical reaction or grafting is described, inter alia, in U.S. Pat. Nos., 3,326,804; 4,089,794; 4,132,661; 4,171,273; 4,137,185; and 4,517,104, all of which are incorporated herein by reference.

The free radical reaction is preferably carried out using free radical initiators such as peroxides and hydroperoxides, and nitrile compounds, and preferably those which have a boiling point greater than about 100° C. and which decompose thermally within the grafting temperature range to provide said free radicals. Representative of these free-radical initiators are azobutyronitrile, 2,5-dimethyl-hex-3-yne-2, 5-bis(tertiary-butyl peroxide) (sold as Luperso 130) or its hexane analogue, di-tertiary butyl peroxide and dicumyl peroxide. The initiator is generally used at a level of between about 0.005% and about 1%, based on the total weight of the polymer solution, and at temperatures of about 150° to 220° C.

The monounsaturated carboxylic reactant, e.g., maleic anhydride, can be generally used in an amount ranging from about 0.01% to about 10%, preferably 0.1 to 2.0%, based on weight of the initial total solution. The aforesaid monounsaturated carboxylic reactant and free-radical initiator are generally used in a weight ratio of monounsaturated carboxylic reactant to free radical initiator of about 1.0:1 to 30:1, preferably 3:1 to 6:1.

The reaction or grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g. with 2,5-dimethyl hex-3-yne-2, 5-bix(t-butyl peroxide) 2 hours at 160° C. and one hour at 170° C., etc.

In the grafting process the ethylene alpha-olefin polymer substituted mono- or dicarboxylic acid material, usually in solution, is first heated to grafting temperature and thereafter said monounsaturated carboxylic reactant and initiator are added with agitation, although they could have been added prior to heating. When the reaction is complete, the excess monounsaturated carboxylic reactant can be eliminated by an inert gas purge, e.g. nitrogen sparging. Preferably the monounsaturated carboxylic reactant that is added is kept below its solubility limit in the polymer solution, e.g., below about 1 wt. %, preferably below 0.4 wt. % or less, of free maleic anhydride based on the total weight of polymer-solvent solution, e.g., ethylene-propylene substituted succinic anhydride/mineral lubricating oil solution. Continuous or periodic addition of the monounsaturated carboxylic reactant along with an appropriate portion of initiator, during the course of the reaction, can be utilized to maintain the monounsaturated carboxylic above its solubility limits, while still obtaining the desired degree of total grafting.

In the grafting step the monounsaturated carboxylic reactant such as maleic anhydride may be grafted onto both the ethylene alpha-olefin polymer substituted mono- or dicarboxylic acid material and the solvent for the reaction. Many solvents such as dichlorobenzene are relatively inert and may be only slightly grafted, while mineral oil will tend to be more grafted. The exact split of graft between the substrates present depends upon the polymer and its reactivity, the reactivity and type of solvent, the concentration of the ethylene alpha-olefin polymer substituted mono- or dicarboxylic acid material in the solvent, and also upon the maintenance of the monounsaturated carboxylic reactant in solution during the course of the reaction and minimizing the presence of dispersed, but undissolved monounsaturated carboxylic reactant, e.g., the maleic anhydride. The undissolved monounsaturated carboxylic reactant appears to have an increased tendency to react to form oil insoluble materials as opposed to dissolved monounsaturated carboxylic reactant. The split between grafted solvent and grafted polymer may be measured empirically from the infrared analyses of the produce dialyzed into solvent and polymer fractions.

The grafting may be preferably carried out in a mineral lubricating oil which need not be removed after the grafting step but can be used as the solvent in the subsequent reaction of the grafted ethylene alpha-olefin substituted mono- or dicarboxylic acid material with the nucleophilic, e.g., amine, material and as a solvent for the end product to form the lubricating additive concentrate. The oil having attached grafted carboxyl groups, when reacted with the nucleophilic reactant such as amine will also be converted to the corresponding derivatives.

The solution grafting step when carried out in the presence of a high temperature decomposable peroxide can be accomplished without substantial degradation of the chain length (molecular weight) of the ethylene alpha-olefin polymer.

By using this further substitution or grafting functionalized ethylene alpha-olefin polymers having higher functionality (e.g., containing more mono- or dicarboxylic acid moieties, such as succinic anhydride, on the ethylene alpha-olefin backbone) can be obtains. Thus, for example, ethylene alpha-olefin polymers containing an average of from about 0.5 to about 2.5 carboxylic acid or anhydride groups, e.g., succinic anhydride groups, per 10,000 number average molecular weight segments of polymer can be obtained. Thus, for example, succinic anhydride substituted ethylene-propylene copolymer of $M_n$ of about 50,000 containing an average number of succinic anhydride groups of from about 2.5 to about 12.5 can be obtained. These additional carboxylic acid or anhydride groups, e.g., succinic anhydride, will be present on the polymer backbone in addition to the terminal carboxylic acid or anhydride group which is grafted onto the polymers of the instant invention as described above.

These grafted ethylene alpha-olefin polymer substituted mono- or dicarboxylic acid materials may then be reacted with the nucleophilic reactants, e.g., amine, as described hereinafore to form the nucleophilically substituted derivative products. When the nucleophilic reactant comprises amine, the resultant product will have a higher nitrogen content, since there are more carboxylic acid or anhydride moieties present on the polymer backbone with which the amines can react, thereby enhancing the dispersant efficacy of the product. Generally, amine substituted derivative products having a total nitrogen content of from about 0.5 to about 2 weight percent of higher can be prepared using this method.

In another embodiment of the instant invention the ethylene alpha-olefin polymer substituted mono- or dicarboxylic acid material, e.g., ethylene propylene copolymer succinic anhydride, instead of being reacted in a reaction mixture containing said ethylene alpha-olefin polymer substituted mono- or dicarboxylic acid material and the nucleophilic reactant such as polyamine or polyol is reacted in a reaction mixture containing (i) a carboxylic acid component and said nucleophilic reactant such as polyamine or polyol, or (ii) the preformed reaction products, e.g., salts, imides, esters, amides, etc., of a carboxylic acid component and the nucleophilic reactant such as polyamine or polyol. Thus, for example a reaction mixture containing the ethylene alpha-olefin polymer substituted mono- or dicarboxylic acid material, e.g., ethylene-propylene substituted succinic anhydride, and carboxylic acid component, e.g., polyisobutenyl substituted succinic anhydride, is prepared by admixing these two reactants, and the nucleophilic reactant such as polyamine is then introduced into this reaction mixture and the reaction is carried out as described hereinafter. Alternatively, the carboxylic acid component and nucleophilic reactant such as polyamine may be added substantially simultaneously to a reaction mixture containing the ethylene alpha-olefin polymer substituted mono- or dicarboxylic acid material.

This embodiment is particularly useful with the ethylene alpha-olefin substituted mono- or dicarboxylic acid material which is further substituted or grafted with addition monounsaturated carboxylic reactant.

CARBOXYLIC ACID COMPONENT

The carboxylic acid component includes: hydrocarbyl substituted dicarboxylic acid or anhydride, preferably succinic anhydride or acid, having 12 to 49 carbons, preferably 16 to 49 carbons in said hydrocarbyl group; long chain monocarboxylic acid of the formula R'COOH where R' is a hydrocarbyl group of 50 to 400 carbons and long chain hydrocarbyl substituted dicarboxylic acid or anhydride, preferably succinic anhydride or acid, having an average number of carbon atoms of from about 50 to about 400 in said hydrocarbyl group. The preferred carboxylic acid component is the long chain hydrocarbyl substituted dicarboxylic acid or anhydride, preferably succinic acid or anhydride, having from about 50 to about 400 in said hydrocarbyl group. Said hydrocarbyl groups are essentially aliphatic and include alkenyl and alkyl groups. The longer chain acids and anhydrides are preferred, particularly when the reaction is carried out in lubricating oil.

The about $C_{50}$-$C_{400}$ hydrocarbyl substituted dicarboxylic acid or anhydride includes the reaction product of the $C_{50}$-$C_{400}$ hydrocarbon polymer, generally a polyolefin, with (i) monounsaturated $C_4$ to $C_{10}$ dicarboxylic acid wherein (a) the carboxyl groups are vicinyl, i.e., located on adjacent carbon atoms, and (b) at least one, preferably both, of said adjacent carbon atoms are part of said monounsaturation; or with (ii) derivatives of (i) such as anhydrides of (i). Upon reaction with the hydrocarbon polymer, the monounsaturation of the dicarboxylic acid, anhydride, etc. becomes saturated. Thus for example, maleic anhydride becomes a hydrocarbyl substituted succinic anhydride.

Typically, from about 0.7 to about 4.0 (e.g., 0.8 to 2.6), preferably from about 1.0 to about 2.0, and most preferably from about 1.1 to about 1.7 moles of said unsaturated $C_4$ to $C_{10}$ dicarboxylic acid, anhydride or ester are charged to the reactor per mole of polyolefin charged.

Normally, not all of the polyolefin reacts with the unsaturated acid or derivative and the hydrocarbyl substituted dicarboxylic acid material will contain unreacted polyolefin. The unreacted polyolefin is typically not removed from the reaction mixture (because such removal is difficult and would be commercially infeasible) and the product mixture, stripped of any unreacted monounsaturated $C_4$ to $C_{10}$ dicarboxylic acid or anhydride, is employed as the carboxylic acid component.

Characterization of the average number of moles of dicarboxylic acid or anhydride, which have reacted per mole of polyolefin charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polyolefin contained in the resulting product mixture can be subsequently modified, i.e., increased or decreased by techniques known in the art, such modifications do not alter functionality as defined above. The term $C_{50}$-$C_{400}$ hydrocarbyl substituted dicarboxylic acid material is intended to refer to the product mixture whether it has undergone such modification or not.

Accordingly, the functionality of the $C_{50}$-$C_{400}$ hydrocarbyl substituted dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such unsaturated dicarboxylic acids or anhydrides thereof are fumaric acid, itaconic acid, maleic acid, maleic anhydride, chloromaleic acid, chloromaleic anhydride, etc.

Preferred about $C_{50}$ to about $C_{400}$ olefin polymers, i.e., olefin polymers containing an average number of carbon atoms of from about 50 to about 400, for reaction with the unsaturated discarboxylic acids or derivatives thereof are polymers comprising a major molar amount of $C_2$ to $C_{10}$, e.g., $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers used will usually have number average molecular weights within the range of about 700 and about 6,000, more usually between about 800 and about 3000. Particularly useful olefin polymers have number average molecular weights within the range of about 900 and about 2500 with approximately one terminal double bond per polymer chain. An especially useful starting material is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

Processes for reacting the about $C_{50}$ to about $C_{400}$ olefin polymer with the $C_{4-10}$ unsaturated dicarboxylic acid or anhydride are known in the art. For example, the olefin polymer and the dicarboxylic acid or derivative may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8 wt. %, preferably 3 to 7 wt. % chlorine, or bromine, based on the weight of polymer, by passing the chlorine or bromine through the polyolefin at a temperature of 60° to 250° C., e.g., 120° to 160° C., for about 0.5 to 10, preferably 1 to 7 hours. The halogenated polymer may then be reacted with sufficient unsaturated acid or derivative at 100° to 250° C., usually about 180° to 235° C., for about 0.5 to 10, e.g. 3 to 8 hours, so the product obtained will contain the desired number of moles of the unsaturated acid or derivative per mole of the halogenated polymer. Processes of this general type are taught in U.S. Pat. Nos. 3,087,936; 3,172,892; 3,272,746 and others.

Alternatively, the olefin polymer, and the unsaturated acid or derivative are mixed and heated while adding chlorine to the hot material. Processes of this type are disclosed in U.S. Pat. Nos. 3,215,707; 3,231,587; 3,912,764; 4,110,349; and in U.K. 1,550,219.

By the use of halogen, about 65 to 95 wt. % of the polyolefin, e.g. polyisobutylene will normally reacted with the dicarboxylic acid or derivative. Upon carrying out a thermal reaction without the use of halogen or a catalyst, then usually only about 50 to 75 wt. % of the polyisobutylene will react. Chlorination helps increased the reactivity.

Particularly preferred as the acid component is polyisobutenyl succinic anhydride.

PREREACTED AMINE OR POLYOL-CARBOXYLIC ACID COMPONENT

The aforementioned nucleophilic reactant, preferably polyamine or polyol, and carboxylic acid component may be prereacted, with the acid moiety being generally attached to the polyamine or polyol through salt, imide, amide, amidine, ester or other linkages so that a primary amino group of the polyamine or a hydroxyl group of the polyol is still available for reaction with the acid or anhydride moieties of the grafted ethylene copolymer. A convenient source of these preacted materials are the well-known and generally commercially available lubricating oil dispersants, provided they retain primary amino groups or hydroxyl groups capable of further reaction with the grafted copolymer.

Usually these dispersants are made by condensing a hydrocarbyl substituted dicarboxylic acid or anhydride, preferably one having about 50 to 400 carbons in the hydrocarbyl substituent, such as these described hereinafore under "Carboxylic Acid Component", preferably a succinic acid producing material such as alkenyl succinic anhydride, with a polyamine or polyol, including those described above under "Polyamines" or "Polyols."

Monocarboxylic acid dispersants have been described in U.S. Patent Specification 983,040. There, polyamines are reacted with the high molecular eight mono carboxylic acid derived from a polyolefin, such as polyisobutylene, by oxidation with nitric acid or oxygen; or by addition of halogen to the polyolefin followed by hydrolyzing and oxidation; etc. Another method is taught in Belgian Patent 658,236, incorporated herein by reference where polyolefin, such as the polymers of $C_2$ to $C_5$ monoolefin, e.g., polypropylene or polyisobutylene, is halogenated, e.g., chlorinated, and then condensed with an alpha, beta-unsaturated, monocarboxylic acid of from 3 to 8, preferably 3 to 4, carbon atoms, e.g., acrylic acid, alpha-methyl-acrylic acid, i.e., 2-methyl propenoic acid, crotonic acid, etc., and then reacted with polyamine.

Formation of dicarboxylic acid dispersant by reaction of an amine with alkenyl succinic anhydride prepared from the reaction of a polyolefin or chlorinated polyolefin and maleic anhydride, etc., is well known in the art, as seen in U.S. Pat. No. 3,272,746, incorporated herein by reference.

Most preferred are the lubricating oil dispersants made by reaction of the aforesaid alkylene polyamines previously described, with $C_{50}$-$C_{400}$ alkenyl succinic anhydrides described hereinafore.

Reaction, preferably amination and/or imidation of the carboxylic acid material is usefully done as a solution reaction with the acid material, usually polyisobutenyl-succinic anhydride, dissolved in a solvent such as mineral oil, to which the other reactant is added. The formation of the dispersants in high yield can be effected by adding from about 0.5 to 3.3, preferably about 0.7 to 1.3, most preferably about 1 to 1 molar proportions of the alkylene polyamine per molar proportion of alkenyl succinic anhydride to said solution and heating the mixture at 140° C. to 165° C. or higher until the appropriate amount of water of reaction is evolved. Typically the mineral oil solvent is adjusted so that is constitutes 50% by weight of the final acyl nitrogen compound solution.

REACTION OF ETHYLENE ALPHA-OLEFIN POLYMER SUBSTITUTED MONO- OR DICARBOXYLIC ACID MATERIAL AND CARBOXYLIC ACID COMPONENT WITH NUCLEOPHILIC REACTANT

The ethylene alpha-olefin substituted mono- or dicarboxylic acid material, preferably in solution generally equal to about 5 to 30 wt. %, preferably 10 to 20 wt % polymer in solution such as oil solution, and carboxylic acid component can be readily reacted with the nucleophilic reactant such as polyamine or polyol, or the ethylene alpha-olefin subtituted mono- or dicarboxylic acid material can be readily reacted with pre-reacted nucleophilic reactant such as polyamine or polyol and carboxylic acid component by admixture and heating at a temperature of from about 100° C. to 250° C., preferably from 150° to 200° C., for from about 0.1 to 10 hours, usually about 0.1 to about 2 hours. In the case of polyamines the heating is preferably carried out to favor formation of imides rather than amides and salts. Thus, imide formation will give a lower viscosity of the reaction mixture than amide formation and particularly lower than salt formation. This lower viscosity permits the utilization of a higher concentration of nitrogen containing ethylene alpha-olefin substituted mono- or dicarboxylic acid material in the oleaginous composition. Removal of water, e.g., by $N_2$ stripping during slow addition of amine with stirring, assures completion of the imidation reaction. Reaction ratios can vary considerably, depending upon the reactants, amounts of excess, type of bonds formed, etc. Generally, the amount of polyamine used is an amount which is effective or sufficient to provide from about 0.5 to about 2.5, preferably from about 0.8 to about 1.2 and more preferably from about 0.9 to about 1.0 equivalents of reactive primary amine moiety per acid equivalent of the acid moiety of the ethylene alpha-olefin substituted mono- or dicarboxylic acid material, e.g., succinic anhydride. If a polyol is used in place of the polyamine generally the amount of polyol reactant used is an amount which is effective or sufficient to provide from about 0.5 to about 2.5, preferably from about 0.8 to about 1.2, and more preferably from about 0.9 to about 1.0 equivalents of reactive hydroxyl moiety per acid equivalent of the acid moiety of the ethylene alpha-olefin substituted mono- or dicarboxylic acid material. The amount of carboxylic acid component used is generally from about 0.5 to about 4, preferably from about 1.0 to 3 mole equivalents per mole equivalent of the acid moiety content, e.g., succinic anhydride content, of the ethylene alpha-olefin substituted mono- or dicarboxylic acid material.

Alternately, if pre-reacted polyamine and carboxylic acid component is used, such as a dispersant, sufficient dispersant is used to provide from about 0.5 to about 2.5 preferably from about 0.8 to about 1.2, and more preferably from about 0.9 to about 1.0 equivalents of reactive primary amine moiety per acid equivalent of the acid moiety of the ethylene alpha-olefin substituted mono- dicarboxylic acid material. Likewise, if pre-reacted polyol and carboxylic acid component is used, such as a dispersant, sufficient dispersant is used to provide from about 0.5 to about 2.5, preferably from about 0.8 to about 1.2, and more preferably from 0.9 to about 1.0 equivalents of reactive hydroxyl moiety per acid equivalent of the grafted dicarboxylic acid moiety of the ethylene alpha-olefin substituted mono- or dicarboxylic acid material.

Another aspect of this invention involves the post treatment of the nitrogen or ester containing dispersant materials. The process for post-treating said nitrogen or ester containing multifunctional viscosity index improver materials is analogous to the post-treating processes used with respect to derivatives of conventional ethylene copolymers of the prior art. Accordingly, the same reaction conditions, ratio of reactants and the like can be used.

The nitrogen-containing multifunctional viscosity index improver materials of the instant invention as described above are post-treated by contacting said nitrogen-containing multifunctional viscosity index improver materials with one or more post-treating reagents selected from the group consisting of boron oxide, boron oxidehydrate, boron halides, boron acids, esters of boron acids, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiosphosphites, $C_1$ to $C_{30}$ hydrocarbyl substituted succinic acids and anhydrides (e.g., succinic anhydride, dodecyl succinic anhydride and the like), maleic anhydride (or any of the above discussed monounsaturated carboxylic reactants useful in forming the ethylene-alpha-olefin polymer-substituted mono- and dicarboxylic acid materials employed in this invention), phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols. The same post-treating reagents are used with the multifunctional viscosity index improver materials prepared from a combination of polyamines and polyol. However, when the dispersant materials are derived from polyols, and that is, when the are esters, the post-treating reagents are usually selected from the group consisting of boron oxide, boron oxide hydrate, boron halides, boron acids, esters of boron acids, sulfur, sulfur chlorides, phosphorus sulfides, phosphorus oxides, epoxides, and episulfides.

For example, the nitrogen containing multifunctional viscosity index improvers can be treated with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Usefully the borated multifunctional viscosity index improvers of the invention contain from about 0.05 to 2.0 wt %, e.g., 0.05 to 0.7 wt. % boron based on the total weight of said borated nitrogen-containing multifunctional viscosity index improver compound. The boron, which appears to be in the product as dehydrated boric acid polymers (primarily $(HBO_2)_3$), is believed to attach to the multifunctional viscosity index improver as amine salts, e.g., the metaborate salt of said amine dispersants.

Treating is readily carried out by adding from about 0.05 to 4, e.g. 1 to 3 wt. % (based on the weight of said nitrogen compound) of said boron compound, preferably boric acid which is most usually added as a slurry to said nitrogen compound and heating with stirring at from about 135° C. to 190, e.g. 140°–170° C., for from 1 to 5 hours followed by nitrogen stripping at said temperature ranges. Or, the boron treatment can be carried out by adding boric acid to the hot reaction mixture of the dicarboxylic acid material and amine while removing water.

Since post-treating processes involving the use of these post-treating reagents is known insofar as application to reaction products of high molecular weight carboxylic acid acylating agents of the prior art and amines and/or alcohols, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704; 3,551,466; 3,415,750; 3,312,619; 3,280,034; 3,718,663; 3,652,616; UK Pat. No. 1,085,903; UK Pat. No. 1,162,436; U.S. Pat. No. 3,558,743.

The nitrogen and/or ester containing multifunctional viscosity index improver materials of this invention can also be treated with polymerizable lactones (such as epsilon-caprolactone) to form multifunctional viscosity index improver adducts having the moiety—[C-(O)(CH$_2$)$_z$O]$_m$H, wherein z is a number of from 4 to 8 (e.g., 5 to 7) and m has an average value of from about 0 to 100 (e.g., 0.2 to 20). The multifunctional viscosity index improver of this invention can be post-treated with a C$_5$ to C$_9$ lactone, e.g., epsilon-caprolactone, by heating a mixture of the multifunctional viscosity index improver material and lactone in a reaction vessel in the absence of a solvent at a temperature of about 50° C. to about 200° C., more preferably from about 75° C. to about 180° C., and most preferably from about 90° C. to about 160° C., for a sufficient period of time to effect reaction. Optionally, a solvent for the lactone, multifunctional viscosity index improver material and/or the resulting adduct may be employed to control viscosity and/or the reaction rates.

In one preferred embodiment, the C$_5$ to C$_9$ lactone, e.g., epsilon-caprolactone, is reacted with a multifunctional viscosity index improver material in a 1:1 mole ratio of lactone to multifunctional viscosity index improver material. In practice, the ration of lactone to multifunctional viscosity index improver material may vary considerably as a means of controlling the length of the sequence of the lactone units in the adduct. For example, the mole ratio of the lactone to the multifunctional viscosity index improver material may vary from about 10:1 to about 0.1:1, more preferably from about 5:1 to about 0.2:1, and most preferably from about 2:1 to about 0.4:1. It is preferable to maintain the average degree of polymerization of the lactone monomer below about 100, with a degree of polymerization on the order of from about 0.2 to about 50 being preferred, and from about 0.2 to about 20 being more preferred. For optimum dispersant performance of the multifunctional viscosity index improver, e.g., viscosity index improver-dispersant, sequences of from about 1 to about 5 lactone units in a row are preferred.

Catalysts useful in the promotion of the lactone-multifunctional viscosity index improver material reactions are selected from the group consisting of stannous octanoate, stannous hexanoate, tetrabutyl titanate, a variety of organic based acid catalysts and amine catalysts, as described on page 266, and forward, in a book chapter authored by R. D. Lundberg and E. F. Cox, entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

Exemplary of adducts formed by reaction of multifunctional viscosity index improver materials if this invention and epsilon-caprolactone are those adducts illustrated by the following equation:

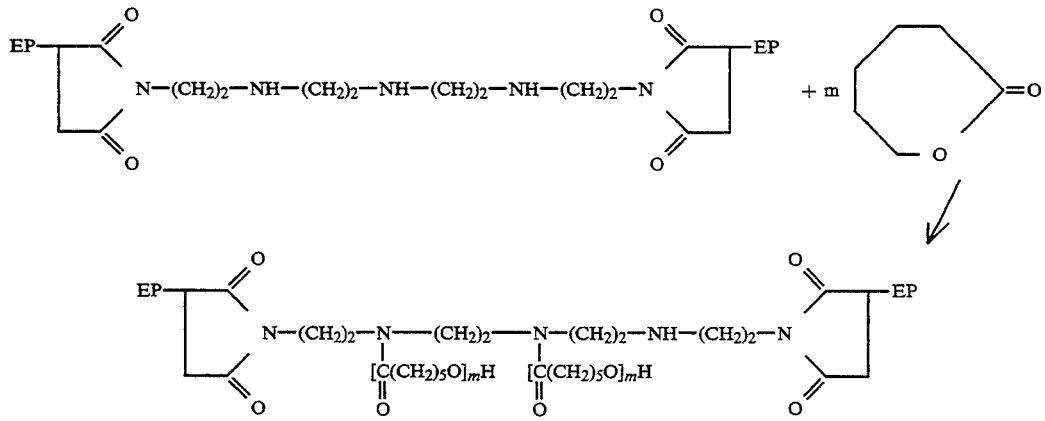

wherein m and EP are as defined above.

Further aspects of the present invention reside in the formation of metal complexes of the novel multifunctional viscosity index improver additives prepared in accordance with this invention. Suitable metal complexes may be formed in accordance with known techniques of employing a reactive metal ion species during or after the formation of the present multifunctional viscosity index improver materials. Complex forming metal reactants include the metal nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like.

As a further feature of the present invention, the (A) ethlyene-alpha-olefin polymer substituted mono-and di-carboxylic acid materials of this invention can be admixed, prior to, after or during being contacted with the selected nucleophillic reagant, with (B) a conventional polyolefin-substituted mono- or dicarboxylic acid material derived from any of the polyolefins discussed above as being useful as a mixed charge with the ethenylenically unsaturated ethylene-alpha-olefin polymers in the formation of the ethlyene-alpha-olefin polymer substituted mono-and di-carboxylic acid materials of this invention. The ethlyene-alpha-olefin polymer substituted mono-and di-carboxylic acid materials of this invention and the polyolefin-substituted mono- or dicarboxylic acid material will be generally admixed prior to contact with the selected nucleophilic reagant, e.g., alkylene polyamine. Such mixtures will generally employ a weight:weight ratio of ethlyene-alpha-olefin polymer substituted mono-and di-carboxylic acid materials of this invention to polyolefin-substituted mono- or dicarboxylic acid material from about 10:90 to 90:10, preferably from about 20:80 to 80:20, and more preferably from about 40:60 to 60:40. Especially preferred are mixtures of ethylene-propylene copolymer-substituted succinic anhydride materials of this invention and ethylene-propylene substituted succinic anhydride. The resulting mixtures can then be contacted for reaction with the selected nucleophillic reagant as described above for formation of multifunctional viscosity index improver materials. The resulting mixed materials can also be treated with any of the above-described post-treatment methods for incorporation of additional functional groups thereon, such as boron, hydroxy, ester, epoxy, lactone, sulfur, metals and the like, as discussed above.

The multifunctional viscosity index improvers of the present invention can be incorporated into a lubricating oil in any convenient way. Thus, these MFVIs can be added directly to the oil by dispersing or dissolving the same in the oil at the desired level of concentrations of the MFVI. Such blending into the additional lube oil can occur at room temperature or elevated temperatures. Alternatively, the multifunctional viscosity index improvers can be blended with a suitable oil-soluble solvent and base oil to form a concentrate, and then blending the concentrate with a lubricating oil basestock to obtain the final formulation.

The lubricating oil basestock for the multifunctional viscosity index improver typically is adapted to perform a selected function by the incorporation of additional additives therein to form lubricating oil compositions (i.e., formulations). Such multifunctional viscosity index improver concentrates will typically contain (on an active ingredient (A.I.) basis) from about 5 to about 60 wt. %, preferably from about 10 to about 60, and more preferably from about 20 to about 50 wt. % multifunctional viscosity index improver additive, and typically from about 40 to 95 wt. %, preferably from about 40 to 90, and more preferably from about 50 to about 80 wt. %, base oil, based on the concentrate weight.

LUBRICATING COMPOSITIONS

The additives of the present invention possess very good multifunctional viscosity index improver dispersant properties as measured herein in a wide variety of environments. Accordingly, the additive mixtures are used by incorporation and dissolution into an oleaginous material such as lubricating oils.

The additives of the present invention find their primary utility in lubricating oil compositions which employ a base oil in which the additives are dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additive mixtures of the present invention.

These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, and ashless dispersant (e.g., polyisobutenyl succinimides) and borated derivatives thereof), etc.

In the preparation of lubricating oil formulations it is common practice to introduce the additives in the form of 10 to 80 wt. %, e.g., 20 to 80 wt. % active ingredient concentrates in hydrocarbon oil, e.g. mineral lubricating oil, or other suitable solvent. Usually these concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The multifunctional viscosity index improver of the present invention will be generally used in admixture with a lube oil basestock, comprising an oil of lubricating viscosity, including natural and synthetic lubricating oils and mixtures thereof.

The amounts of the multifunctional viscosity index improvers, e.g., viscosity index improvers-dispersants, of the present invention present in oleaginous compositions such as lubricating oil compositions is at least a viscosity index improving effective amount, i.e., an amount effective to improve the viscosity index of the oleaginous material. In the particular case of a viscosity index improver-dispersant the amount present is a viscosity index improving and dispersant effective amount, i.e., an amount effective to improve the viscosity index of the oleaginous material and to impart dispersancy properties to said composition. Generally, these amounts are usually from about 0.01 to about 20 wt. %, preferably from about 0.05 to about 12 wt %., more preferably from about 0.1 to about 10 wt. %, and most preferably from about 0.25 to about 6 wt. %, of the total composition.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of polyethylene glycol having a molecular weight of 500–1000, diethyl ether of polypropylene glycol having a molecular weight of 1000–1500); and mono- and polycarboxylic esters thereof, for example, the acetic acid esters, mixed $C_3$-$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tertbutylphenyl)silicate, hexa-(4-methyl-2-pentoxy)disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Metal containing rust inhibitors and/or detergents are frequently used with multifunctional viscosity index improvers. Such detergents and rust inhibitors include the metal salts of sulphonic acids, alkyl phenols, sulphurized alkyl phenols, alkyl salicylates, naphthenates, and other oil soluble mono- and di-carboxylic acids. Highly basic, that is overbased metal salts which are frequently used as detergents appear particularly prone to interaction with the ashless dispersant. Usually these metal containing rust inhibitors and detergents are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Highly basic alkaline earth metal sulfonates are frequently used as detergents. They are usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 3 to more than 30 carbon atoms. For example haloparaffins, olefins obtained by dehydrogenation of paraffins, polyolefins produced from ethylene, propylene, etc. are all suitable. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

A preferred alkaline earth sulfonate additive is magnesium alkyl aromatic sulfonate having a total base number ranging from about 300 to about 400 with the magnesium sulfonate content ranging from about 25 to about 32 wt. %, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g. calcium, salts of mixtures of C$_8$-C$_{26}$ alkyl salicylates and phenates (see U.S. Pat. No. 2,744,069) or polyvalent metal salts of alkyl salicyclic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and naphthenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

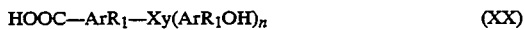

$$\text{HOOC—ArR}_1\text{—X}_y(\text{ArR}_1\text{OH})_n \qquad (XX)$$

where Ar is an aryl radical of 1 to 6 rings, R$_1$ is an alkyl group having from about 8 to 50 carbon atoms, preferably 12 to 30 carbon atoms (optimally about 12), X is a sulfur (—S—) or methylene (—CH$_2$—) bridge, y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenolsalicylic acid of the general formula (XXI):

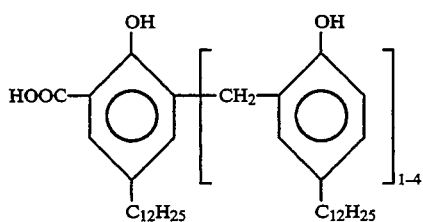

with a TBN of 60 to 150 is highly useful in this invention.

The sulfurized metal phenates can be considered the "metal salt of a phenol sulfide" which thus refers to a metal salt whether neutral or basic, of a compound typified by the general formula (XXII):

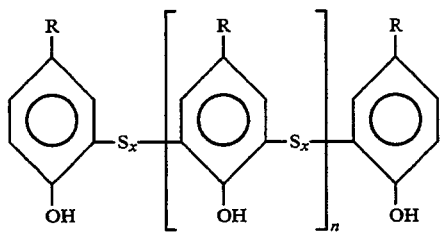

where x=1 or 2, n=0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14% by weight, preferably about 4 to about 12 wt. % sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate has a metal content up to and greater than 100% in excess of the metal present in the corresponding normal sulfurized metal phenates wherein the excess metal is produced in oil-soluble or dispersible form (as by reaction with CO$_2$). The overbased sulfurized metal phenates desirably have a TBN value of at least 150, e.g. from 200 to 300.

Magnesium and calcium containing additives although beneficial in other respects can increase the tendency of the lubricating oil to oxidize. This is especially true of the highly basic sulphonates.

According to a preferred embodiment the invention therefore provides a crankcase lubricating composition also containing from 2 to 8000 parts per million of calcium or magnesium.

The magnesium and/or calcium is generally present as basic or neutral detergents such as the sulphonates and phenates, our preferred additives are the neutral or basic magnesium or calcium sulphonates. Preferably the oils contain from 500 to 5000 parts per million of calcium or magnesium. Basic magnesium and calcium sulphonates are preferred.

A particular advantage of the novel multifunctional viscosity index improvers of the present invention is, since they provide both viscosity index improvement and dispersancy, they can be used to form multi-grade automobile engine lubricating oils. The instant multifunctional viscosity index improvers can also be used in combination with index improvers or modifiers. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may also be derivatized to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene and hydrogenated derivatives thereof. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,794; 4,160,739; 4,137,185; or copolymers of ethylene and propylene reacted or grafted with nitrogen compounds such as shown in U.S. Pat. Nos. 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and 10 to 85 wt. %, preferably 20 to 70 wt % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexane, 5-methylpentenl-1, 4,4-dimethyl-1-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$-$C_{20}$ aliphatic or aromatic olefin per mole of unsaturated ester, or per mole of unsaturated acid or anhydride followed by esterification. For example, copolymers of styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinylpyridine, 3-vinylpyridine, 3-methyl-5-vinyl-pyridine, 4-methyl-2-vinylpyridine, 4-ethyl-2-vinyl-pyridine and 2-butyl-1-5-vinylpyridine and the like.

N-vinyl lactams are also suitable, e.g. N-vinyl pyrrolidones or N-vinyl piperidones.

The vinyl pyrrolidones are preferred and are exemplified by N-vinyl pyrrolidone, N-(1-methylvinyl) pyrrolidone, N-vinyl-5-methyl pyrrolidone, N-vinyl-3, 3-dimethylpyrrolidone, N-vinyl-5-ethyl pyrrolidone, etc.

Dihydrocarbyl dithiophosphate metal salts are frequently used as anti-wear agents and also provide anti-oxidant activity. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved anti-wear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

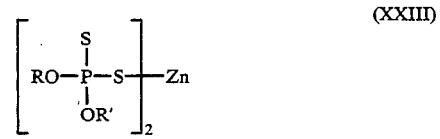

(XXIII)

wherein R and R' may be the same or different hydrocarbyl radicals containing from 1 to 18, preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl etc. In order to obtain oil solubility, the total number of carbon atoms (i.e., R and R' in formula XXIII) in the dithiophosphoric acid will generally be about 5 or greater.

The antioxidants useful in this invention include oil soluble copper compounds. The copper may be blended into the oil as any suitable oil soluble copper compound. By oil soluble we mean the compound is oil soluble under normal blending conditions in the oil or additive package. The copper compound may be in the cuprous or cupric form. The copper may be in the form of the copper dihydrocarbyl thio- or dithio-phosphates wherein copper may be substituted for zinc in the compounds and reactions described above although one mole of cuprous or cupric oxide may be reacted with one or two moles of the dithiophosphoric acid, respectively. Alternatively the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(RR'NCSS)_nCu$, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R') will generally be about 5 or greater. Copper sulphonates, phenates, and acetylacetonates may also be used.

Exemplary of useful copper compounds are copper ($Cu^I$ and/or $Cu^{II}$) salts of alkenyl succinic acids or anhydrides. The salts themselves may be basic, neutral or acidic. They may be formed by reacting (a) any of the materials discussed above in the Ashless Dispersant section, which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts of this invention are Cu salts of polyisobutenyl succinic anhydride (hereinafter referred to as Cu-PIBSA), and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a $M_n$ from about 900 to 1400, and up to 2500, with a $M_n$ of about 950 being most preferred. Especially preferred, of those listed above in the section on Dispersants, is polyisobutylene succinic acid (PIBSA). These materials may desirably be dissolved in a solvent, such as a mineral oil, and heated in the presence of a water solution (or slurry) of the metal bearing material. Heating may take place between 70° and about 200° C. Temperatures of 110° to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-oleate, or mixtures thereof) will be generally employed in an amount of from about 50–500 ppm by weight of the metal, in the final lubricating composition.

The copper antioxidants used in this invention are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120)) part per million of added copper based on the weight of the lubricating oil composition. Of course, the preferred amount may depend amongst other factors on the quality of the basestock lubricating oil.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for ½ to 15 hours, at a temperature in the range of 65° to 315° C. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxy-alkylene hydrocarbyl succinimide, S-carboxyalkylene hydrocarbyl succinamic acid and mixtures thereof; U.S. Pat. No. 3,879,306 which discloses N-(hydroxyalkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are glycerol mono and dioleates, and succinate esters, or metal salts thereof, of hydrocarbyl substituted succinic acids or anhydrides and thiobis alkanols such as described in U.S. Pat. No. 4,344,853.

Pour point depressants lower the temperature at which the lubricating oil will flow or can be poured. Such depressants are well known. Typical of those additives which usefully optimize the low temperature fluidity of the fluid are $C_8$-$C_{18}$ dialkylfumarate vinyl acetate copolymers, polymethacrylates, and wax naphthalene.

Foam control can be provided by an antifoamant of the polysiloxane type, e.g. silicone oil and polydimethyl siloxane.

Organic, oil-soluble compounds useful as rust inhibitors in this invention comprise nonionic surfactants such as polyoxyalkylene polyols and esters thereof, and anionic surfactants such as salts of alkyl sulfonic acids. Such anti-rust compounds are known and can be made by conventional means. Nonionic surfactants, useful as anti-rust additives in the oleaginous compositions of this invention, usually owe their surfactant properties to a number of weak stabilizing groups such as ether linkages. Nonionic anti-rust agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred rust inhibitors are polyoxyalkylene polyols and derivatives thereof. This class of materlais are commercially available from various sources: Pluronic Polyols from Wyandotte Chemicals Corporation; Polyglycol 112-2, a liquid triol derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors in the improved composition of the present invention.

In addition to the polyols per se, the esters thereof obtained by reacting the polyols with various carboxylic acids are also suitable. Acids useful in preparing these esters are lauric acid, stearic acid, succinic acid, and alkyl- or alkenyl-substituted succinic acids wherein the alkyl-or alkenyl group contains up to about twenty carbon atoms.

The preferred polyols are prepared as block polymers. Thus, a hydroxy-substituted compound, R—(OH)n (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydropnylic portion resulting in a molecule having both hydrophobic and hydrophylic portions. The relative sizes of these portions can be adjusted by regulating the ratio of reactants, time of reaction, etc., as is obvious to those skilled in the art. Thus it is within the skill of the art to prepare polyols whose molecules are characterized by hydrophobic and hydrophylic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophylic portion decreased. If greater oil-in-water emulsion breaking ability is required, the hydrophylic and/or hydrophobic portions can be adjusted to accomplish this.

Compounds illustrative of R—(OH)n include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Other suitable demulsifiers include the esters disclosed in U.S. Pat. Nos. 3,098,827 and 2,674,619.

The liquid polyols available from Wyandotte Chemical Co. under the name Pluronic Polyols and other similar polyols are particularly well suited as rust inhibitors. These Pluronic Polyols correspond to the formula:

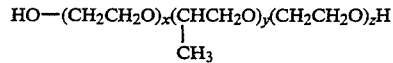

(XXIV)

wherein x,y, and z are integers greater than 1 such that the $CH_2CH_2O$— groups comprise from about 10% to about 40% by weight of the total molecular weight of the glycol, the average molecule weight of said glycol being from about 1000 to about 5000. These products are prepared by first condensing propylene oxide with propylene glycol to produce the hydrophobic base

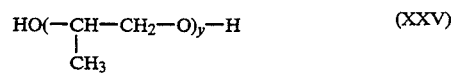

(XXV)

This condensation product is then treated with ethylene oxide to add hydrophylic portions to both ends of the molecule. For best results, the ethylene oxide units should comprise from about 10 to about 40% by weight of the molecule. Those products wherein the molecular weight of the polyol is from about 2500 to 4500 and the ethylene oxide units comprise from about 10% to about 15% by weight of the molecule are particularly suitable. The polyols having a molecular weight of about 4000 with about 10% attributable to (CH$_2$CH$_2$O) units are particularly good. Also useful are alkoxylated fatty amines, amides, alcohols and the like, including such alkoxylated fatty acid derivatives treated with C$_9$ to C$_{16}$ alkyl-substituted phenols (such as the mono- and di-heptyl, octyl, nonyl, decyl, undecyl, dodecyl and tridecyl phenols), as described in U.S. Pat. No. 3,849,501, which is also hereby incorporated by reference in its entirety.

These compositions of our invention may also contain other additives such as those previously described, and other metal containing additives, for example, those containing barium and sodium.

The lubricating composition of the present invention may also include copper lead bearing corrosion inhibitors. Typically such compounds are the thiadiazole polysulphides containing from 5 to 50 carbon atoms, their derivatives and polymers thereof. Preferred materials are the derivatives of 1,3,4-thiadiazoles such as those described in U.S. Pat. Nos. 2,719,125; 2,719,126; and 3,087,932; especially preferred is the compound 2,5 bis (t-octadithio)- 1,3,4-thiadiazole commercially available as Amoco 150. Other similar materials also suitable are described in U.S. Pat. Nos. 3,821,236; 3,904,537; 4,097,387; 4,107,059; 4,136,043; 4,188,299; and 4,193,882.

Other suitable additives are the thio and polythio sulphenamides of thiadiazoles such as those described in U.K. Patent Specification 1,560,830. When these compounds are included in the lubricating composition, we prefer that they be present in an amount from 0.01 to 10, preferably 0.1 to 5.0 weight percent based on the weight of the composition.

Dispersants maintain oil insolubles, resulting from oxidation during use, in suspension in the fluid thus preventing slide glocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

The ashless dispersants include the polyalkenyl or borated polyalkenyl succinimide where the alkenyl groups is derived from a C$_3$-C$_4$ olefin, especially polyisobutenyl having a number average molecular weight of about 700 to 5,000. Other well known dispersants include the oil soluble polyol esters of hydrocarbon substituted succinic anhydride, e.g., polyisobutenyl succinic anhydride, and the oil soluble oxazoline and lactone oxazoline dispersants derived from hydrocarbon substituted succinic anhydride and disubstituted amino alcohols. Lubricating oils typically contain about 0.5 to 5 wt. % of ashless dispersant.

Some of these numerous additives can provide a multiplicity of effects, e.g. a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
| --- | --- | --- |
| Viscosity Modifier | .01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the novel multifunctional viscosity index improver of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the multifunctional viscosity index improver of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted.

EXAMPLE 1 - PREPARATION OF ETHYLENE-PROPYLENE COPOLYMER

A clean, dry autoclave is flushed with propylene and a 4 ml. solution of methylalumoxane in toluene is added by syringe. The autoclave is then charged with 500 ml. of liquid propylene and brought to 50° C. for reaction. The pressure in the autoclave is then increased by 150 psi by addition of ethylene. One-half mg. of zirconocene (bis(n-butyl tetrahydroindenyl)zirconium dichloride) dissolved in 3 ml. of toluene is injected into the autoclave. Ethylene is supplied to maintain the initial total pressure in the autoclave. Reaction time is 30 minutes. The monomers are flashed off, and the temperature is brought to 25° C. The polymer product, which has a number average molecular weight in the range of about 209,000, is recovered from the autoclave and is dried in a vacuum oven at 50° C. overnight.

EXAMPLE 2 - PREPARATION OF ETHYLENE-PROPYLENE COPOLYMER SUBSTITUTED SUCCINIC ANHYDRIDE (EPSA)

Into a pressure reactor equipped with a stirrer and a thermocouple and heated by means of an electric heating mantle are charged under dry $N_2$ at atmospheric pressure 1.2 moles of pulverized maleic anhydride for every one mole of ethylene propylene copolymer, which copolymer is prepared substantially in accordance with the procedure of Example 1. The reaction mixture is heated to 70° C. and the reactor is purged with dry $N_2$ by bubbling through the liquid reaction mass for 15 minutes. The purging is then ceased and the reactor temperature is raised to 220° C. and is kept there under autogenous pressure for 4 hours while stirring. The liquid reaction mixture is then cooled to about 60° C., and transferred to a glass beaker. Dry gaseous nitrogen is passed through the liquid to strip off unreacted maleic anhydride at about 140° C. The resultant liquid product contains the EPSA and unreacted EP.

EXAMPLE 3 - PREPARATION OF EPSA-PAM

Succinic acid anhydride substituted ethylene-propylene copolymer which is prepared substantially in accordance with the procedure of Example 2 is dissolved in an equal amount by weight of a mineral oil, S150N. To the polymer (EPSA) solution is added a mixture of polyethylene polyamines having the average composition corresponding to tetraethylene pentamine and containing about 32.6 wt. % N (PAM), and the reaction mixture is heated to 140° C. under nitrogen while stirring for about 2 to 4 hours. The molar ratio of total polymer to polyamine in terms of succinic acid equivalents to PAM which is charged is 2 to 1.

EXAMPLE 4

An SAE 10W40 formulation crankcase motor oil composition is prepared by dissolving sufficient EPSA-PAM which is prepared substantially in accordance with the procedure of Example 4 in mineral oil to provide a composition containing 1.3 wt. % (active ingredient) of said copolymer. The oil also contains 4.3 wt. % of a detergent inhibitor package of conventional additives.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A lubricating oil concentrate containing from about 20 to 60 wt. % of an oil soluble composition useful as a multifunctional viscosity index improver additive comprising adduct of:
   (a) ethylene alpha-olefin polymer substituted with mono- or dicarboxylic acid producing moieties, said polymer comprising monomer units derived from ethylene and at least one alpha-olefin of the formula $H_2C=CHR^1$ wherein $R^1$ is an alkyl group of from 1 to 18 carbon atoms, wherein said polymer has a number average molecular weight of from above 20,000 to about 500,000, wherein an average of at least about 30% of said polymer chains contain terminal ethenylidene unsaturation, and wherein the functionality of the substituted ethylene alpha-olefin polymer is at least about 0.5, said acid producing moieties being derived from at least one monounsaturated carboxylic reactant selected from the group consisting of (i) monounsaturated $C_4$ to $C_{10}$ dicarboxylic acids wherein (a) the carboxyl groups are attached to adjacent carbon atoms and (b) at least one, preferably both of said adjacent carbon atoms are part of said monounsaturation; (ii) anhydride or $C_1$ to $C_5$ alcohol derived mono- or diester derivatives of (i); (iii) monounsaturated $C_3$ to $C_{10}$ monocarboxylic acids wherein the carbon-carbon double bond is allylic to the carboxy group and (iv) $C_1$ to $C_5$ alcohol derived mono- or diester derivatives of (iii) and
   (b) at least one nucleophilic reagent selected from the group consisting of amines, alcohols, amino alcohols, metal reactants and mixtures thereof, said nucleophilic reagent having been reacted with said substituted ethylene alpha-olefin polymer through said mono- or dicarboxylic acid producing moieties.

2. A lubricating oil composition containing a viscosity index improving amount of the oil soluble composition of claim 1.

3. A lubricating oil composition according to claim 2 containing from about 0.1 to about 10 wt. % of said oil soluble composition.

4. A lubricating oil composition containing from about 0.01 to about 20 wt. % of the oil soluble composition of claim 1.

5. A lubricating oil concentrate containing from about 1 to 80 wt. % of an additive which comprises an ethylene alpha-olefin polymer substituted with at least one of $C_3$ to $C_{10}$ monounsaturated monocarboxylic acid producing moieties and $C_4$ to $C_{10}$ monounsaturated dicarboxylic acid producing moieties, said polymer comprising monomer units derived from ethylene and at least one alpha-olefin of the formula $H_2C=CHR^1$ wherein $R^1$ is an alkyl group of from 1 to 18 carbon atoms, wherein said polymer has a number average molecular weight of from about greater than about 20,000 to about 500,000, wherein an average of at least about 30 percent of said polymer chains contain terminal ethenylidene unsaturation, wherein the functionality of the substituted ethylene alpha-olefin polymer is at least about 0.5.

6. A lubricating oil composition containing from about 0.01 to about 20 wt. % of the substituted ethylene alpha-olefin polymer of claim 5.

7. A lubricating oil concentrate containing from about 20 to about 60 wt. % of an oil soluble composition useful as multifunctional viscosity index improver additive for oleaginous composition comprising reaction product of:
   (a) ethylene alpha-olefin polymer substituted with mono- or dicarboxylic acid producing moieties, said polymer comprising monomer units derived from ethylene and at least one alpha-olefin of the formula $H_2C=CHR^1$ wherein $R^1$ is an alkyl group of from 1 to 18 carbon atoms, wherein said polymer has a number average molecular weight of from above 20,000 to about 500,000, wherein an average of at least about 30% of said polymer chains contain terminal ethenylidene unsaturation, and wherein the functionality of the substituted ethylene alpha-olefin polymer is at least about 0.5, said acid producing moieties being derived from at least one monounsaturated carboxylic reactant selected from the group consisting of (i) monounsaturated $C_4$ to $C_{10}$ dicarboxylic acids wherein (a) the carboxyl groups are attached to adjacent carbon atoms and (b) at least one, preferably both, of said adjacent carbon atoms are part of said monounsaturation; (ii) anhydride or $C_1$ to $C_5$ alcohol derived mono- or diester derivatives of (i); (iii) monounsaturated $C_3$ to $C_{10}$ monocarboxylic acids wherein the carbon-carbon double bond is allylic to the carboxy group; and (iv) $C_1$ to $C_5$ alcohol derived mono- or diester derivatives of (iii);

(b) hydrocarbyl-substituted carboxylic acid producing material containing 1 to 2 carboxylic acid groups or anhydride group wherein said hydrocarbyl contains an average number of carbon atoms of from about 12 to about 400, and (c) at least one nucleophilic reagent selected from the group consisting of amines, alcohols, amino alcohols, metal reactants, and mixtures thereof, said nucleophilic reagent having been reacted with said substituted ethylene alpha-olefin polymer through said mono- or dicarboxylic acid producing moieties.

8. A lubricating oil composition containing from about 0.01 to about 20 wt. % of the composition of claim 7.

* * * * *